(12) United States Patent
Jung et al.

(10) Patent No.: US 10,408,430 B2
(45) Date of Patent: Sep. 10, 2019

(54) ASYMMETRIC LIGHTING LENS, LIGHTING LENS ARRAY, AND LIGHTING APPARATUS THEREWITH

(71) Applicant: SAMSUNG ELECTRONICS CO., LTD., Suwon-si, Gyeonggi-do (KR)

(72) Inventors: Seung-gyun Jung, Hwaseong-si (KR); Won-soo Ji, Hwaseong-si (KR); Jong-sup Song, Hwaseong-si (KR); Sang-woo Ha, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/713,072

(22) Filed: Sep. 22, 2017

(65) Prior Publication Data
US 2018/0087751 A1    Mar. 29, 2018

(30) Foreign Application Priority Data
Sep. 23, 2016    (KR) .................. 10-2016-0122382

(51) Int. Cl.
*F21V 5/04*    (2006.01)
*F21V 15/01*    (2006.01)
(Continued)

(52) U.S. Cl.
CPC ............... *F21V 15/01* (2013.01); *F21K 9/68* (2016.08); *F21V 5/045* (2013.01); *F21V 7/0091* (2013.01); *G02B 3/0006* (2013.01); *G02B 19/0028* (2013.01); *G02B 19/0061* (2013.01); *G02B 19/0066* (2013.01); *F21S 8/086* (2013.01);
(Continued)

(58) Field of Classification Search
CPC . F21V 5/007; F21V 5/008; F21V 5/04; F21V 5/10; G02B 3/0006; G02B 3/02; G02B 3/10; F21L 15/02
See application file for complete search history.

(56) References Cited

U.S. PATENT DOCUMENTS 6,372,608 B1    4/2002  Shimoda et al.
6,645,830 B2    11/2003  Shimoda et al.
(Continued)

FOREIGN PATENT DOCUMENTS

JP    2014-003168 A    1/2014
JP    2014-191336 A    10/2014
(Continued)

*Primary Examiner* — Diane I Lee
*Assistant Examiner* — Keith G. Delahoussaye
(74) *Attorney, Agent, or Firm* — Lee & Morse, P.C.

(57) ABSTRACT

There are provided a lighting lens, a lighting lens array, and a lighting apparatus. The lighting lens may include an incidence part to receive light from a light source and an emission part to emit light provided from the incidence part. The incidence part may have a concave region that contains a light source and a first protrusion at a rear side of the light source that protrudes downwards from a top surface of the concave region. The emission part may include a dome-shaped part that encloses the incidence part and a second protrusion at the rear side of the light source that protrudes upwards from a top surface of the dome-shaped part. A lowermost portion of the emission part may be formed at a first plane, and an angle between an outer surface of the emission part and the first plane is an obtuse angle.

20 Claims, 20 Drawing Sheets

(51) Int. Cl.
*F21K 9/68* (2016.01)
*F21V 7/00* (2006.01)
*G02B 3/00* (2006.01)
*G02B 19/00* (2006.01)
*F21S 8/08* (2006.01)
*F21V 5/00* (2018.01)
*F21V 5/08* (2006.01)
*F21W 131/103* (2006.01)
*F21Y 105/16* (2016.01)
*F21Y 115/10* (2016.01)

(52) U.S. Cl.
CPC ............... *F21V 5/007* (2013.01); *F21V 5/08* (2013.01); *F21V 7/0083* (2013.01); *F21W 2131/103* (2013.01); *F21Y 2105/16* (2016.08); *F21Y 2115/10* (2016.08)

(56) References Cited

U.S. PATENT DOCUMENTS

| | | | |
|---|---|---|---|
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,068,288 B1 | 11/2011 | Pitou | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,449,150 B2 | 5/2013 | Allen et al. | |
| 8,459,832 B2 | 6/2013 | Kim | |
| 8,502,242 B2 | 8/2013 | Kim | |
| 8,536,604 B2 | 9/2013 | Kwak et al. | |
| 8,628,222 B2 * | 1/2014 | Kelley | F21V 5/002 362/311.06 |
| 8,733,981 B2 | 5/2014 | Jiang et al. | |
| 8,735,931 B2 | 5/2014 | Han et al. | |
| 8,766,295 B2 | 7/2014 | Kim | |
| 9,157,607 B2 | 10/2015 | Wang et al. | |
| 9,200,765 B1 | 12/2015 | Broughton | |
| 2006/0044806 A1 | 3/2006 | Abramov et al. | |
| 2014/0016326 A1* | 1/2014 | Dieker | F21V 13/04 362/308 |
| 2015/0192256 A1 | 7/2015 | Hyun et al. | |
| 2016/0047528 A1 | 2/2016 | Goldstein et al. | |
| 2016/0084481 A1* | 3/2016 | Duckworth | F21V 17/02 362/232 |

FOREIGN PATENT DOCUMENTS

KR 10-1287023 B1 7/2013
WO WO-2014029025 A1 * 2/2014 ............ F21S 8/086

* cited by examiner

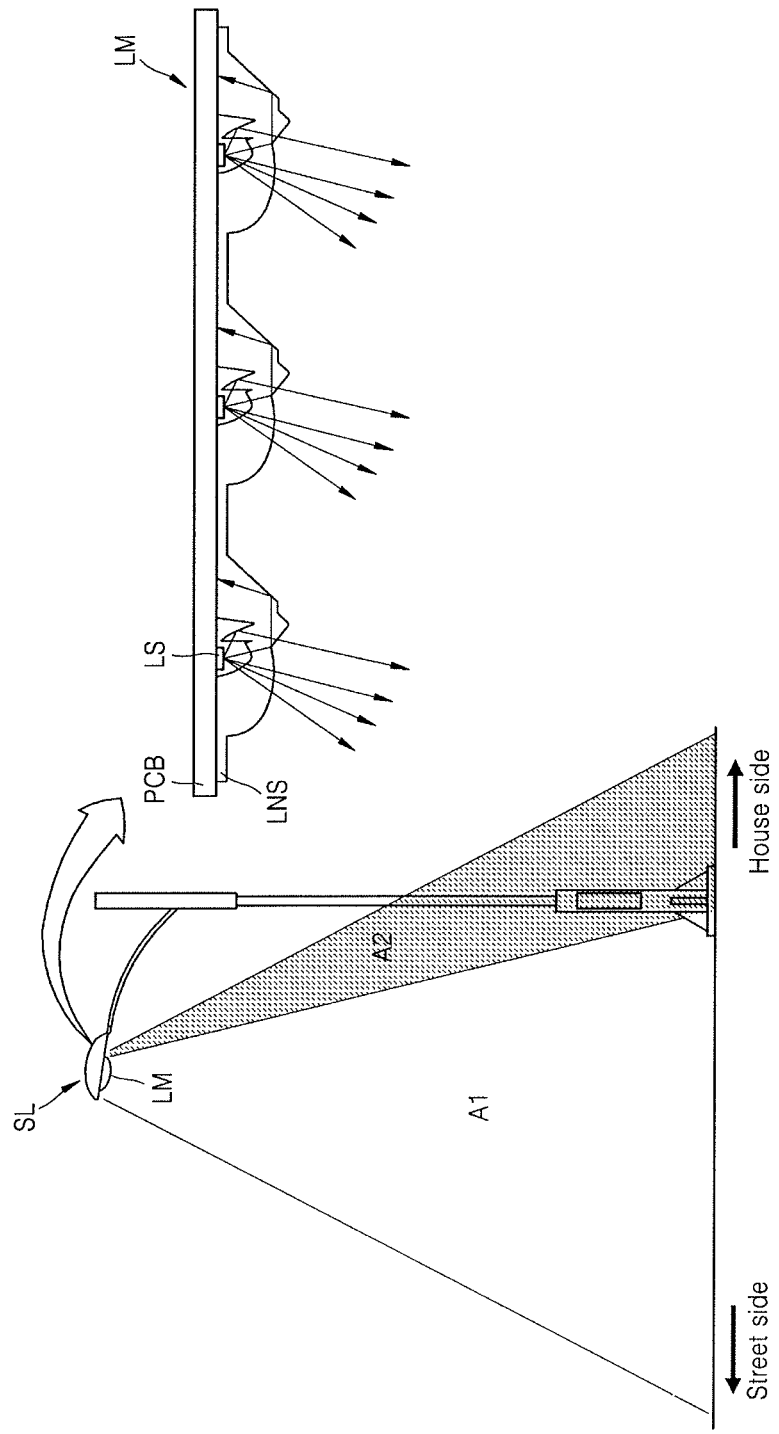

ASYMMETRIC LIGHTING LENS, LIGHTING LENS ARRAY, AND LIGHTING APPARATUS THEREWITH

CROSS-REFERENCE TO RELATED APPLICATION

Korean Patent Application No. 10-2016-0122382, filed on Sep. 23, 2016, in the Korean Intellectual Property Office, and entitled: "Lighting Lens, Lighting Lens Array, and Lighting Apparatus Therewith," is incorporated by reference herein in its entirety.

BACKGROUND

1. Field

Embodiments relate to a lighting lens, a lighting lens array, and a lighting apparatus therewith, and in particular, to a lighting lens capable of controlling a luminous intensity distribution property, a lighting lens array, and a lighting apparatus therewith.

2. Description of the Related Art

Due to its long lifetime, low power consumption, small size, and high durability, a light-emitting diode (LED) is being widely used as a light source of a lighting apparatus. Since light emitted from the LED travels in all directions from a light emitting surface, e.g., 180 degrees therefrom, a lighting apparatus using the LED as a light source may have a lens and/or a reflector for diffusing light to be emitted from the LED. For a lighting apparatus with an LED, the directional dependence of luminous intensity distribution may need to be controlled.

SUMMARY

One or more embodiments provide a lighting lens including an incidence part and an emission part to emit light provided from the incidence part. The incidence part may include a concave region to contain a light source, and a first protrusion at a rear side of the light source in a first direction that protrudes downwards from a top surface of the concave region. The emission part may include a dome-shaped part to enclose the incidence part, and a second protrusion at the rear side of the light source in the first direction that protrudes upwards from a top surface of the dome-shaped part. A lowermost portion of the emission part may be at a first plane, and an angle between an outer surface of the emission part and the first plane may be an obtuse angle.

One or more embodiments provides a lighting lens array including a plate including a plurality of holes corresponding to a plurality of light sources, respectively, and a plurality of cores on the plate. The plurality of cores may be in communication with the plurality of holes, respectively, and may include a plurality of concave regions containing the plurality of light sources respectively. Each of the plurality of cores may include an incidence part and an emission part to emit light provided from the incidence part. The incidence part may include the concave region and a first protrusion provided at a rear side of the light source that protrudes downwards from a top surface of the concave region. The emission part may include a dome-shaped part to enclose the incidence part and a second protrusion at a rear side of the light source that protrudes upwards from the top surface of the dome-shaped part. An intersection line, at which an outer surface of the core and a top surface of the plate meet, may form a closed curve on the top surface of the plate.

One or more embodiments provide a lighting apparatus including a circuit substrate, a light source on the circuit substrate, and a lighting lens covering the light source. The lighting lens may include an incidence part to receive light from the light source and an emission part to emit light provided from the incidence part. The incidence part may include a concave region contain the light source and a first protrusion at a rear side of the light source in a first direction that protrudes downwards from a top surface of the concave region. The emission part may include a dome-shaped part to enclose the incidence part and a second protrusion at the rear side of the light source in the first direction that protrudes upwards from a top surface of the dome-shaped part. A lowermost portion of the emission part may be formed at a first plane, and an angle between an outer surface of the emission part and the first plane may be an obtuse angle.

One or more embodiments provide a lighting apparatus including a circuit substrate and a plurality of light sources on the circuit substrate. The plurality of light sources may include a lighting lens array. The lighting lens array may include a plate including a plurality of holes corresponding to the plurality of light sources, respectively, and a plurality of cores on the plate. The plurality of cores may be commmunication with the plurality of holes, respectively, and may include a plurality of concave regions containing the plurality of light sources respectively. Each of the plurality of cores may include an incidence part including the concave region and a first protrusion at a rear side of the light source that protrudes downwards from a top surface of the concave region, and an emission part to emit light provided from the incidence part. The emission part may include a dome-shaped part to enclose the incidence part and a second protrusion at a rear side of the light source that protrudes upwards from the top surface of the dome-shaped part.

One or more embodiments provide a lighting lens having an incidence part to receive light form a light source and emission part to emit provided form the incidence part. The incidence part may include a concave region and a first protrusion at a rear side of the light source in a first direction, the first protrusion protruding downwards from a top surface of the concave region along a second direction, orthogonal to the first direction. The emission part may include a dome-shaped part to enclose the incidence part and a second protrusion at the rear side of the light source in the first direction, the second protrusion protruding upwards from a top surface of the dome-shaped part along the second direction. The first and second protrusions may overlap along the second direction.

BRIEF DESCRIPTION OF THE DRAWINGS

Features will become apparent to those of skill in the art by describing in detail exemplary embodiments with reference to the attached drawings in which:

FIG. 15 illustrates a schematic diagram of a light irradiation range of a street light, in which a lighting apparatus according to some embodiments is provided.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
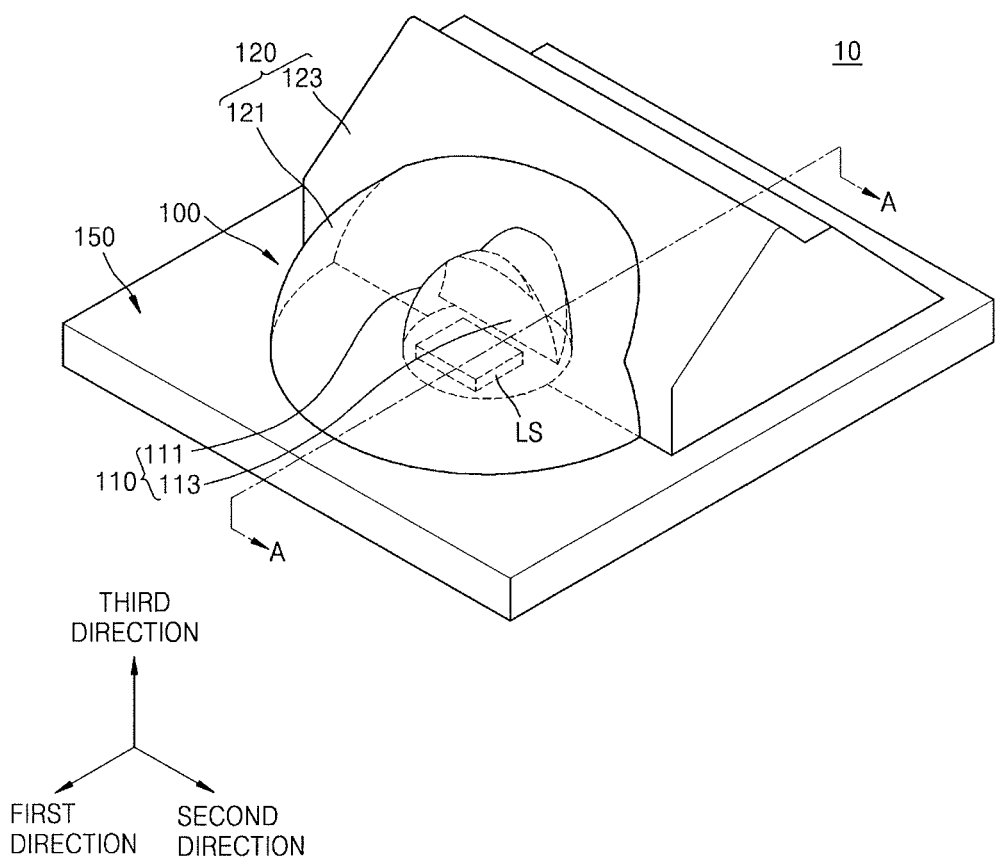
FIG. 1 illustrates a perspective view of a lighting lens according to some embodiments.
Figure 2A:
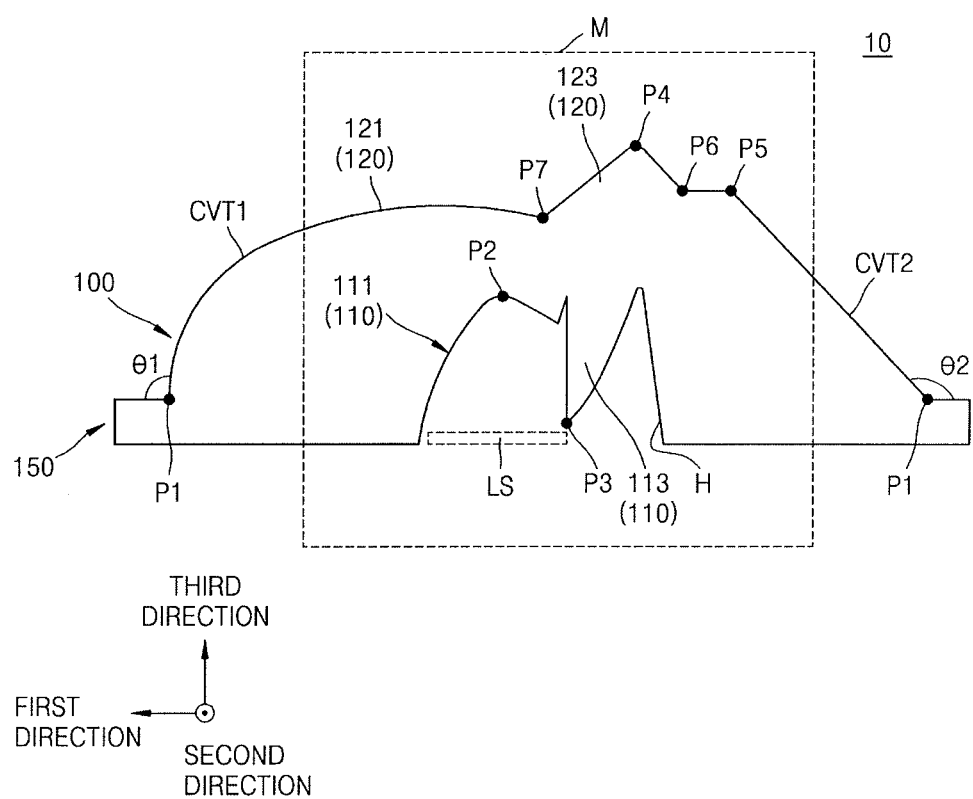
FIG. 2A illustrates a sectional view of the lighting lens taken along line A-A of FIG. 1.
Figure 2B:
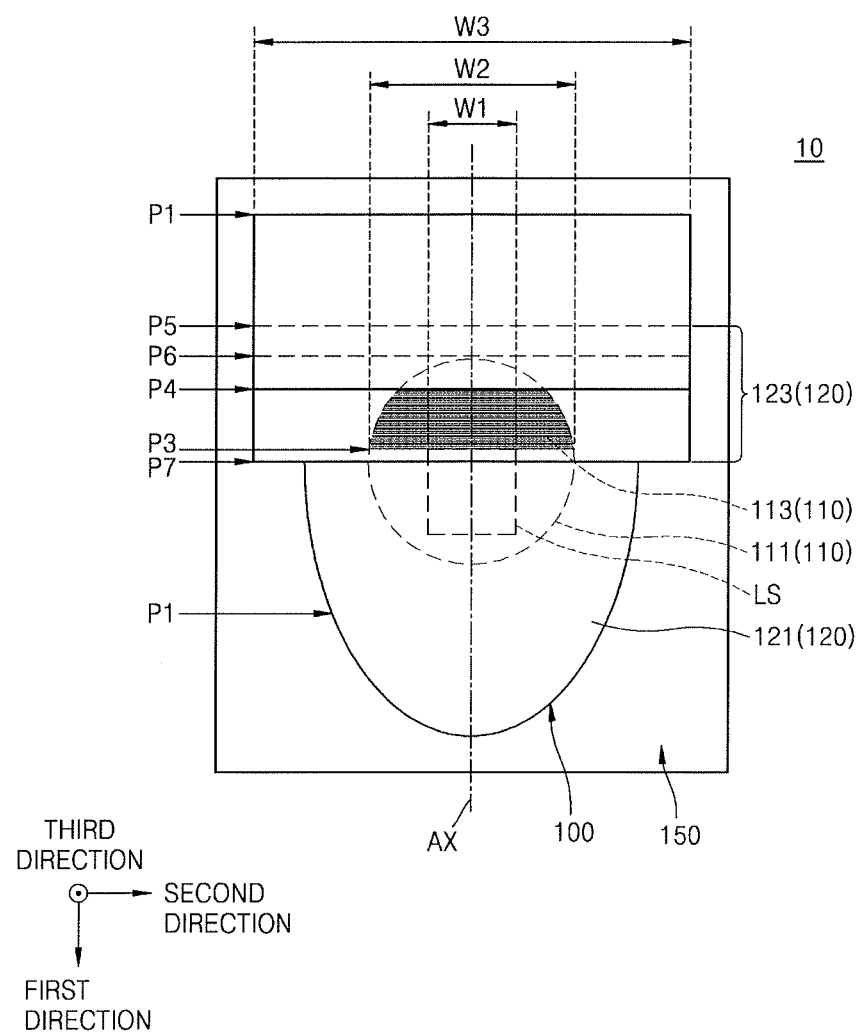
FIG. 2B illustrates a top plan view of the lighting lens of FIG. 1.
Figure 2C:
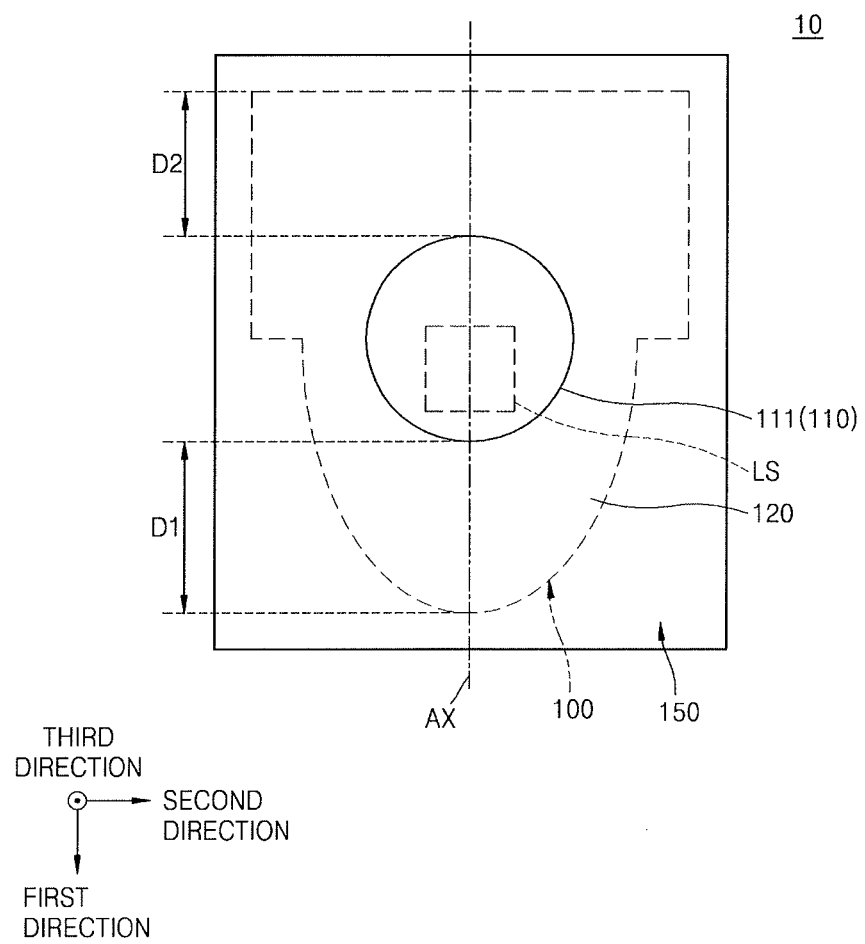
FIG. 2C illustrates a bottom plan view of the lighting lens of FIG. 1.

FIG. 1 is a perspective view illustrating a lighting lens 10 according to some embodiments. FIG. 2A is a sectional view of the lighting lens 10 taken along line A-A of FIG. 1. FIGS. 2B and 2C are top and bottom plan views, respectively, of the lighting lens 10 of FIG. 1. Referring to FIGS. 1 and 2A to 2C, the lighting lens 10 may include a plate 150 and a core 100 on the plate 150.

A top surface of the plate 150 and an outer surface of the core 100 may meet at a first point P1 and may form an intersection line. The intersection line formed by the top surface of the plate 150 and the outer surface of the core 100 may form a closed curve. The plate 150 and the core 100 may be provided as a single body, and the lighting lens 10 may be formed of a material transparent to light to be emitted from a light source LS.

The core 100 may include an incidence part 110, onto which the light emitted from the light source LS is incident, and an emission part 120, from which the light incident onto the incidence part 110 is emitted.

The incidence part 110 may include a concave region 111 and a first protrusion 113, which together enclose the light source LS. The concave region 111 may be at a front side of the light source LS in a first direction, e.g., may overlap the light source LS in the first direction, and extend over a majority of the light source LS light emitting surface, e.g., may overlap along a third direction such that a majority of light from the light source LS is incident on the concave region. The first protrusion 113 may be at a rear side of the light source LS in the first direction and may have a shape protruding downwards from a top surface of the concave region 111, e.g., along the third direction such that light from the light source LS that is not incident on the concave region is incident on the first protrusion 113. The first protrusion 113 may not extend along the third direction down to a level of an emitting surface of the light source LS, e.g., a lowest point of the concave region 111 may be lower than a lowest Point of the first protrusion 113. Further, the concave region 111 may not be exposed to the outside, except for a hole H of the plate 150.

The first direction may mean a direction toward a region to be lit (LR) by the light source LS. Accordingly, the rear side of the light source LS in the first direction, e.g., adjacent the first protrusion 113, may be positioned at an opposite side of the LR with the light source LS therebetween, e.g., towards a region is not to be lit (NLR). A front side of the light source LS in the first direction, e.g., where the light source LS and the first concave region 111 overlap in the first direction, may be positioned near or toward the LR.

The concave region 111 may be a concave dome-shaped structure, the highest level of which is positioned at a second point P2. However, embodiments are not limited thereto. The concave region 111 may be positioned to be closer to a rear side of the emission part 120 than to a central region of the emission part 120 in the first direction. Referring to FIG. 1 in conjunction with FIG. 2C, a distance D1 from an outer surface of the emission part 120 at the front side of the concave region 111 to an inner surface of the concave region 111 may be greater than a distance D2 from the outer surface of the emission part 120 at the rear side of the concave region 111 to the inner surface of the concave region 111, e.g., the end of the hole H.

The first protrusion 113 may include a third point P3 at the lowermost level thereof. The first protrusion 113 may be adjacent the light source LS. The first protrusion 113 may be wide enough to intercept light emitted from the light source LS. Referring to FIG. 1 in conjunction with FIG. 2B, the light source LS may have a first width W1 and the first protrusion 113 may have a second width W2 that is greater than the first width W1, as measured in a second direction.

The emission part 120 may include a dome-shaped part 121 to enclose the incidence part 110 and a second protrusion 123 at the rear side of the light source LS that protrudes upwards, e.g., along the third direction, e.g., at an acute angle relative to the third direction, from a top surface of the dome-shaped part 121. The second protrusion 123 may overlap, e.g., overlap, the first protrusion 113 along the third direction. The second protrusion may be positioned to receive light from the first protrusion.

Referring to FIG. 1 in conjunction with FIG. 2B, the concave region 111, the second protrusion 123, and the first protrusion 113 may be sequentially arranged along an imaginary axis AX parallel to the first direction. Accordingly, in a sectional view taken along the first direction, the lighting lens 10 may have an asymmetric structure. However, in a sectional view taken along the second direction, each of the concave regions 111, the first protrusion 113, and the second protrusion 123 may have a symmetric structure with respect to the imaginary axis AX.

The emission part 120 may include a plurality of the second protrusions 123. One of the second protrusions 123 may have a peak positioned at a fourth point P4 and a flat surface including fifth and sixth points P5 and P6. Two second protrusions 123 may be formed on the top surface of the dome-shaped part 121, as shown in FIGS. 1 to 2C. However, embodiments are not limited thereto. In some embodiments, the lighting lens 10 may include at least one second protrusion 123 protruding from the top surface of the dome-shaped part 121. An outer surface of the second protrusion 123 and the top surface of the dome-shaped part 121 may meet at a seventh point P7. The seventh point P7 may be closer to the rear surface of the light source LS than the second point P2 along the first direction and may be further from the rear surface of the light source than a point where a first surface 1135I of the first protrusion 113 and the first concave region 111 meet.

The first concave region 111 and the dome-shaped part 121 may determine a propagation path of light emitted from a first half of the light source LS, e.g., forward light directed to the LR. The first and second protrusions 113 and 123 may determine a propagation path of light emitted from a second half of the light source LS, e.g., backward light directed to the NLR. For example, the first and second protrusions 113 and 123 may suppress backward light propagating toward the NLR and may direct this light towards the LR.

In detail, potential illumination regions around a lighting apparatus may be divided into the LR and the NLR. For example, when a street light is at an edge of a road, the street light may be configured in such a way that illumination light is irradiated onto the road but not onto a region adjacent to the road. In particular, backward light propagating in a backward direction from the street light may lead to light pollution on facilities near the road and surrounding environment.

According to some embodiments, the first and second protrusions 113 and 123 of the lighting lens 10 may cause the total internal reflection of backward light emitted from the light source LS and propagate toward the NLR. That is, a propagation path of light may be controlled to allow most of the light emitted from the light source LS to propagate toward the LR. Thus, it may be possible to prevent or suppress the backward light from being irradiated onto the NLR, to reduce light pollution, and to allow the illumination light to concentrate onto the LR. Accordingly, it may be possible to improve a coefficient of utilization. The backward-light suppressing effect will be described in more detail with reference to FIGS. 4A to 7B.

Referring to FIG. 2A, an outer surface of the emission part 120 may have a first curvature CVT1 at the front side of the concave region 111 and a second curvature CVT2, which is less than the first curvature CVT1, at the rear side of the concave region 111. The second curvature CVT2 may be 0, e.g., the outer surface of the emission part 120 may be flat or planar at the rear side of the concave region 111. In particular, the emission part 120 may have a sloped, but uncurved, surface at the rear side thereof. Since a front-side region of the emission part 120 has a relatively large curvature, illumination light emitted therefrom may be irradiated onto a wide region. Since a rear-side region of the emission part 120 has a relatively small curvature, the total internal reflection of light propagating from the light source LS in the backward direction may result.

Referring to FIG. 2B, when viewed in a third direction perpendicular to the first and second directions, the second protrusion 123 may have a rectangular or tetragonal shape. The first protrusion 113 may follow a circle that would be formed if the concave region 111 was continuously provided, as indicated by the dashed circle. The light source LS may have a first width W1 in the second direction, and the first protrusion 113 may have a second width W2, which is greater than the first width W1, in the second direction. Even at its narrowest, the first protrusion 113 may be wider than the first width. Accordingly, most of the backward light generated by the light source LS may be incident into the first protrusion 113. Thus, it may be possible to prevent or suppress light that does not pass through the first protrusion 113 from being emitted as backward light.

The second protrusion 123 may have a third width W3 that is greater than the second width W2 in the second direction. Accordingly, most of the light passing through the first protrusion 113 may be incident into the second protrusion 123, which may cause the total internal reflection of light propagating in the backward direction.

At points P1, the outer surface of the core 100 and the top surface of the plate 150 may meet at obtuse angles θ1 and θ2. The lowermost portion of the emission part 120 may be in contact with the top surface of the plate 150 in all directions. In other words, the lowermost portion of the emission part 120 may be formed to constitute a closed curve on a plane, and the outer surface of the emission part 120 and the plane may meet at obtuse angles θ1 and θ2.

Thus, the outer surface of the core 100 may not form an inverse draft, e.g., an acute angle, with respect to the top surface of the plate 150. When the outer surface of the core 100 forms an inverse draft, it may be necessary to perform an additional process during a process of fabricating a lens, which may lead to an increase in product cost or deterioration in performance of a lighting apparatus with a lens.

In detail, a lens may be fabricated by a shaping process using a mold. Here, if the lens has an inverse draft region, it may be difficult to perform a shaping process or an additional process may be needed. That is, if the mold itself has an embossing portion for forming an inverse draft region in a lens, a lens may be formed in the mold by a molding process. However, since the inverse draft region of the lens is coupled to the embossing portion of the mold, it may be hard to remove the mold and draw out the lens.

When an additional component to be inserted into the inverse draft region of the lens in the mold is introduced, the mold and the component may be sequentially removed to draw out the lens, after the molding process. However, the use of the component may lead to forming a hole in a region of the plate connected to the core. That is, since the core is provided on the plate, the inverse draft region of the core should also be formed on the plate. Accordingly, the component for forming the inverse draft region may occupy a region of the plate positioned below the inverse draft region, and a hole may be formed in the plate of the lens drawn.

Since a lighting lens is directly exposed to an external environment, there may be high demand for a lighting lens that is resistant to environmental factors, e.g., dustproof, waterproof, and so forth. However, the hole formed in the lens may lead to deterioration in performance of a lighting apparatus in which the lens is used, e.g., make the lighting apparatus more susceptible to environmental damage. Further, when using the hole, additional back-end processes may be needed, resulting in increased product cost and increased complexity in an assembling process.

In contrast, in the lighting lens 10 according to embodiments, the outer surface of the core 100 and the top surface of the plate 150 may not form an inverse draft. Accordingly, it may be possible to reduce various technical difficulties (e.g., a difficulty in a fabrication process, an increase in product cost, and an additional process) that may be caused by an inverse draft region of a lens. That is, in the lighting lens 10 according to embodiments, a structure with first and second protrusions may be formed simultaneously using a single mold defining the first and second protrusions. Thus, the structure of and the fabrication process of the lighting lens 10 may be simplified, while maintaining high luminance in the LR and low luminance in the NLR.

Furthermore, in the lighting lens 10 according to embodiments, since the outer surface of the core 100 does not include the inverse draft region, the concave region 111 may not be exposed to the outside, except for the hole H of the plate 150. That is, the lighting lens 10 may provide an isolated space preventing the light source LS from being in contact with an external environment. Accordingly, a lighting apparatus with the lighting lens 10 may have good dustproof and waterproof characteristics, stable operation characteristics, and a long lifetime.

Figure 3:
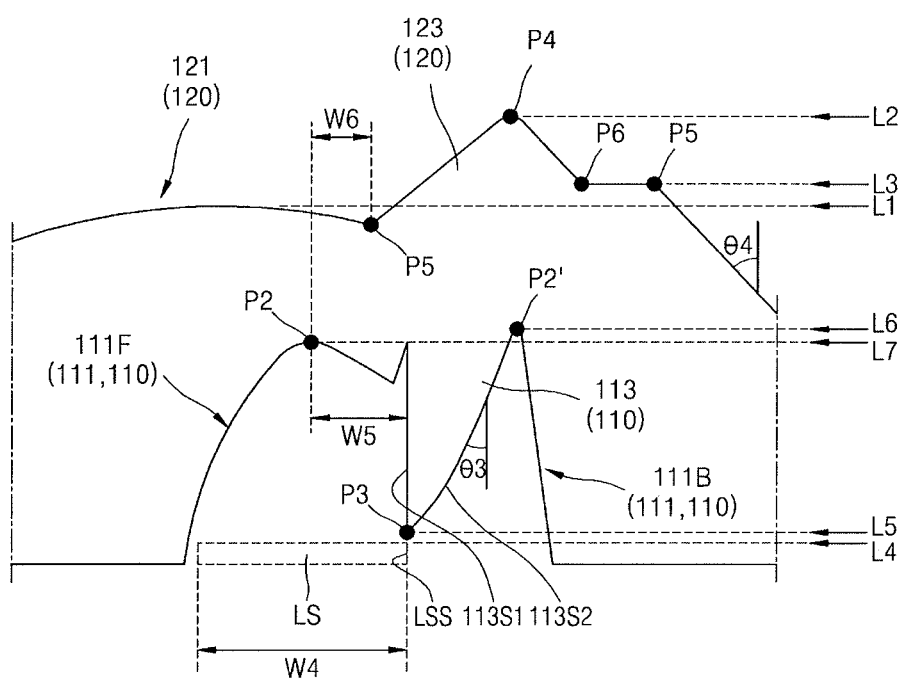
FIG. 3 illustrates an enlarged sectional view of a portion 'M' of FIG. 2A.

FIG. 3 is an enlarged sectional view illustrating a portion 'M' of FIG. 2A.

Referring to FIG. 3, the incidence part 110 may include the concave region 111 and the first protrusion 113 protruding downwards from the top surface of the concave region 111. Here, the concave region 111 may include a front-end concave region 111F and a back-end concave region 111B that are divided by the first protrusion 113. The front-end concave region 111F may be defined by an inner surface of the concave region 111 and a first surface 113S1 of the first protrusion 113 and may be configured to contain the light source LS. The back-end concave region 111B may be defined by the inner surface of the concave region 111 and a second surface 113S2 of the first protrusion 113.

A width of the first protrusion 113 along the first direction may decrease in a downward direction from the top surface of the concave region 111 along the third direction towards the light source LS. Here, the first protrusion 113 may include the first surface 113S1, onto which the light emitted from a light source LS is incident, and the second surface 113 S2, from which light refracted from the first surface 113S1 is emitted. In other words, the first surface 113S1 may be a front-side surface of the first protrusion 113. The second surface 113S2 may be a rear-side surface of the first protrusion 113, e.g., further from the light source in the first direction. The first surface 113S1 may be a flat surface that is perpendicular to the top surface of the light source LS, and the second surface 113S2 may be a curved surface. In some embodiments, the second surface 113S2 may have an angle θ3 of about 20 to 45 degrees with respect to the third direction.

Embodiments are not limited to the example of FIG. 3, in which the first and second surfaces 113S1 and 113S2 are illustrated as flat and curved surfaces, respectively. The first surface 113S1 may have a finite curvature. In addition, although the first surface 113S1 is shown to be perpendicular to the top surface of the light source LS, embodiments are not limited thereto. For example, the first surface 113S1 may be inclined at an angle to the third direction.

In some embodiments, the first surface 113S1 and the second surface 113S2 may meet to form an intersection line with the point P3, and the intersection line may be coplanar with a side surface LSS of the light source LS. In this case, most of the light generated in the light source LS may be incident into the first protrusion 113. Thus, it may be possible to prevent or suppress light that does not pass through the first protrusion 113 from being emitted as backward light.

Also, a level L5 of a bottom surface of the first protrusion 113 may be substantially equal to a level L4 of a top surface of the light source LS. Accordingly, most of the light generated in the light source LS may propagate through the first protrusion 113. For convenience in description, the level L5 of the bottom surface of the first protrusion 113 of FIG. 3 is shown to be different from the level L4 of the top surface of the light source LS. However, embodiments are not limited thereto.

The concave region 111 may be formed to contain a light source LS having a first width W4 in a first direction. Here, a point P2 at the highest level of an inner surface of the concave region 111 may be spaced apart from a point P3, at which the first surface 113S1 and the second surface 113S2 meet, by a width W5 in the first direction. The width W5 may be greater than half the first width W4. In this case, even if the point P2 is not positioned at a center region of the light source LS, the light source LS may be covered with a front-end concave region 111F and the first protrusion 113. Accordingly, most of the light emitted from the light source LS may be incident into the first protrusion 113, thus preventing or suppressing light that does not pass through the first protrusion 113 from being emitted as backward light.

A level L6 of the point P2', at which the inner surface of the concave region 111 and the second surface 113S2 meet, may be higher than a level L7 of the point P2 which is the highest point of the inner surface of the concave region 111. This may increase an area of the second surface 113S2 and, thus, increase the amount of total internal reflection light due to the second surface 113S2.

The emission part 120 may include a dome-shaped part 121 to enclose the incidence part 110 and a second protrusion 123 at the rear side of the light source LS and protrudes upwards from a top surface of the dome-shaped part 121. Light generated in the light source LS may be incident into the second protrusion 123 through the inner surface of the concave region 111 or may be incident into the second protrusion 123 as a result of total internal reflection by the first and second surfaces 113S1 and 113S2 of the first protrusion 113.

In some embodiments, a plurality of the second protrusions 123 may be sequentially arranged in the first direction. The plurality of second protrusions 123 may have top surfaces that are positioned at levels L2 and L3. As shown in FIG. 3, the levels L2 and L3 may be higher than a level L1 of a top surface of the dome-shaped part 121. At least one of the plurality of second protrusions 123 may have a top surface that is flat. The second protrusion 123 may have a peak point P4 and may have points P5 and P6 that are positioned on a flat surface, e.g., form a plane parallel to the first direction. A level of a top surface of each of the plurality of second protrusions 123 may be lower along the third direction in a direction away from the concave region 111 along the first direction. In other words, the level L3 of the points P5 and P6, which are relatively far from the concave region 111, may be lower than the level L2 of the point P4 adjacent to the concave region 111.

The point P2 may be positioned at the highest level L7 of the inner surface of the concave region 111, and the dome-shaped part 121 and the second protrusion 123 may meet at the point P5, which is spaced apart from the point P2 by a width W6 in the first direction. The width W6 may be equal to or less than ⅓ times the first width W4 of the light source LS in the first direction. However, embodiments are not limited thereto.

An outer surface of the emission part 120 may be formed at an obtuse angle to a flat surface that is parallel to the top surface of the plate 150. That is, the outer surface of the emission part 120 may not include an inverse draft region. When the outer surface of the emission part 120 forms an inverse draft, additional processes for fabrication of the lens may be needed, increasing product cost and/or deteriorating performance of a lighting apparatus with such a lens.

In the lighting lens 10 according to embodiments, it may be possible to reduce various technical difficulties (e.g., a difficulty in a fabrication process, an increase in product cost, and an additional process) that may be caused by an inverse draft region of the emission part 120. The lighting lens 10 may be easily fabricated by a molding process using a mold. The lighting lens 10 may have substantially the same structure as the afore-described structure, in which an inverse draft is not formed between the outer surface of the core 100 and the top surface of the plate 150.

In some embodiments, the outer surface of the emission part 120, which is positioned at the rear side of the concave region 111, may have an angle θ4 of about 30 to 60 degrees with respect to the third direction.

Each element of the lighting lens 10 shown in FIGS. 1 to 3 may have a shape that is dependent on a variation of a fabrication process. For example, variations from the shapes of the illustrations as a result, for example, of fabrication techniques and/or tolerances, may be expected. Thus, the disclosed example embodiments should not be construed as limited to the particular shapes of elements illustrated herein unless expressly so defined herein, but are to include deviations in shapes that result, for example, from fabricating.

Figure 4A:
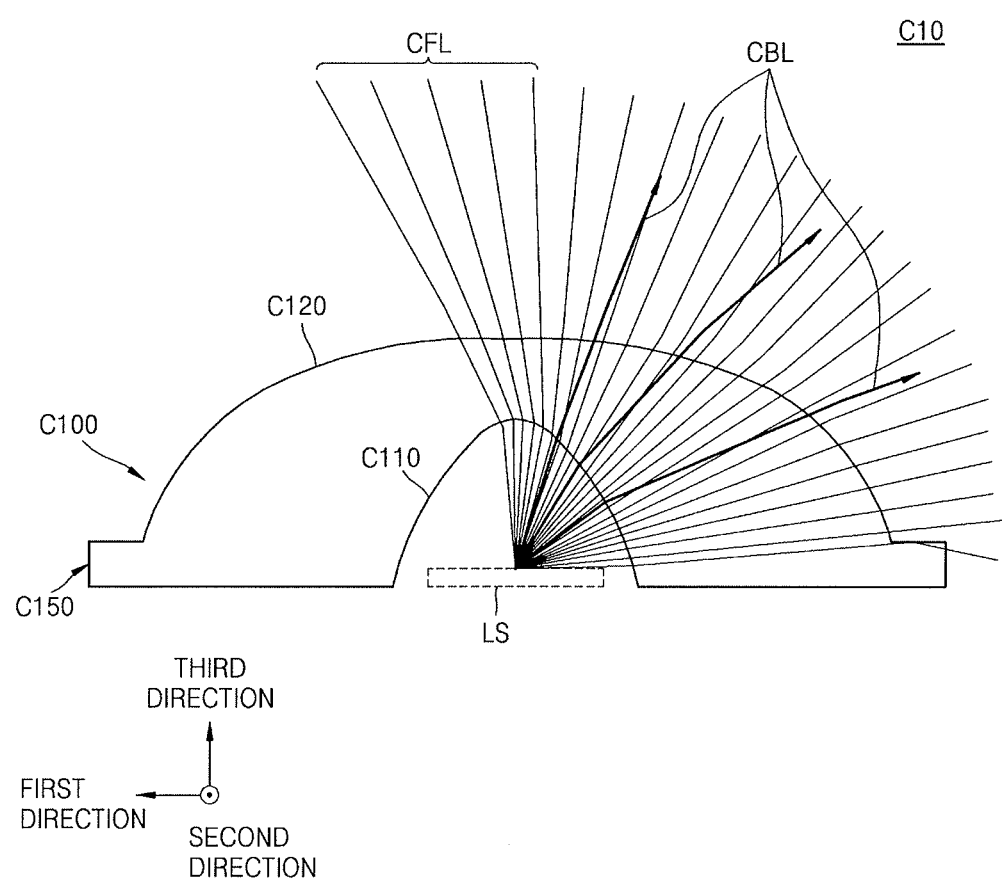
FIGS. 4A and 4B illustrate sectional views provided to describe light directivity characteristics of a conventional lighting lens and a lighting lens according to some embodiments, respectively.
Figure 4B:
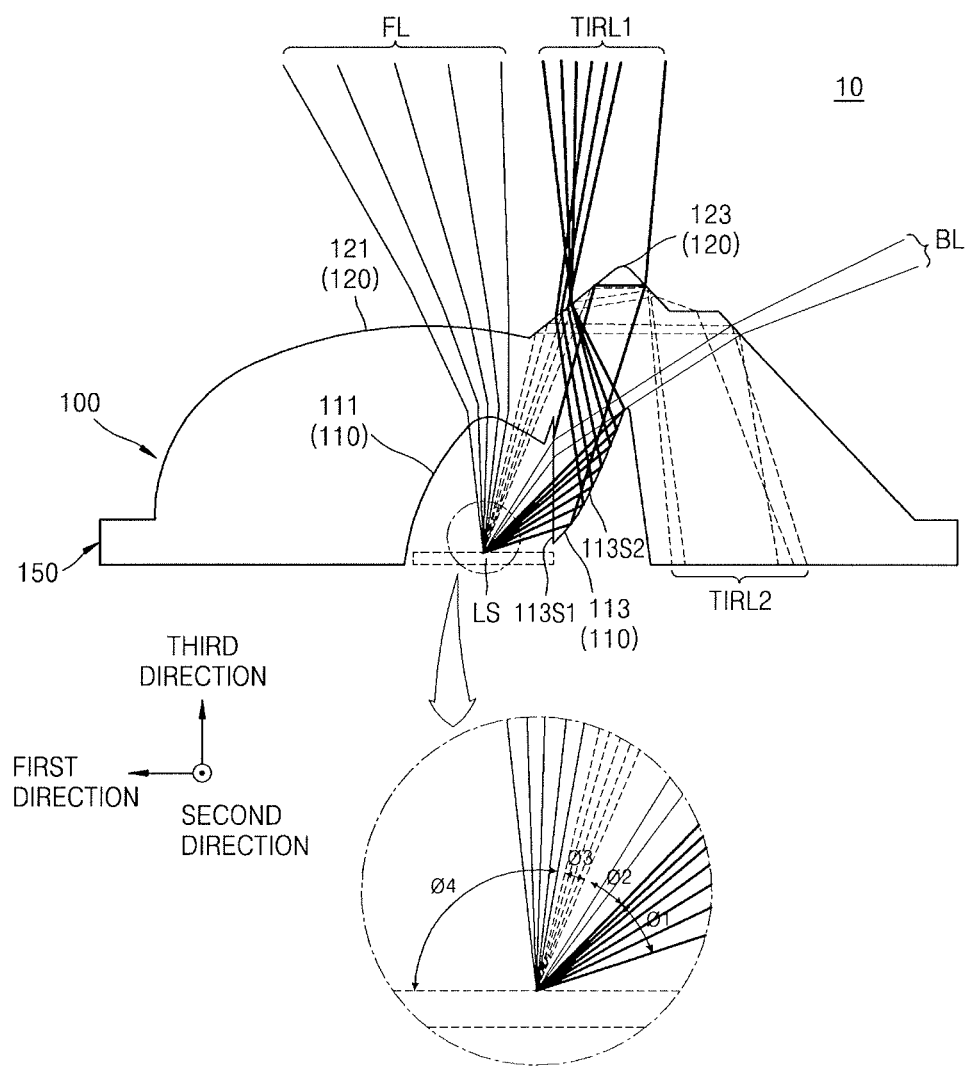

FIGS. 4A and 4B are sectional views provided to describe light directivity characteristics of a conventional lighting lens C10 and the lighting lens 10 according to some embodiments, respectively. In FIGS. 4A and 4B, arrows depict some propagation paths of light generated by the light source LS and emitted to pass through the conventional lighting lens C10 or the lighting lens 10, respectively. Although paths of backward light propagating toward a NLR are illustrated in FIGS. 4A and 4B, light generated in the light source LS may be emitted at various directional angles or in all directions. That is, a fraction of the light generated in the light source LS may propagate toward the LR, but a description thereof will be omitted, as these light paths will be the same for both structures and simply propagate through the dome shaped portions thereof.

FIG. 4A illustrates propagation paths of light emitted from the conventional lighting lens C10, when the conventional lighting lens C10 is provided on the light source LS. The conventional lighting lens C10 consists of an intagliated or embossed dome-shaped incidence part C110 that encloses the light source LS and a dome-shaped emission part C120 that encloses the incidence part C110. In this case, the light emitted from the light source LS in all directions may be incident into a main body of the conventional lighting lens C10 through the incidence part C110 and may be emitted to the outside through the emission part C120 without limitation. Accordingly, a fraction of the light may be used as illumination light CFL irradiating the LR, and another fraction of the light may be illuminated as backward light CBL irradiating the NLR.

To reduce or remove the backward light CBL, an additional process may be performed to provide a reflection plate or form a light absorption coating layer on a region of the conventional lighting lens C10, from which the backward light CBL is emitted, but this may increase product cost and complexity of an assembling structure.

Referring to FIG. 4B, the lighting lens 10 according to embodiments may include a first protrusion 113 and a second protrusion 123 that are provided on a path of light propagating toward the NLR. For example, the lighting lens 10 may include the first protrusion 113 provided in the incidence part 110 and the second protrusion 123 provided in the emission part 120.

The first protrusion 113 and/or the second protrusion 123 may cause total internal reflection of light emitted from the light source LS. The total internal reflection light caused by the first protrusion 113 and the second protrusion 123 may propagate along a path toward the front side of the light source LS, not toward the rear side of the light source LS. In other words, the first protrusion 113 and the second protrusion 123 may be used to change a propagation path of the light emitted from the light source LS from a direction toward the NLR to a direction toward the LR, which may make it possible to suppress backward light and to increase a utilization factor at the LR.

In detail, a fraction of the light generated in the light source LS may have a first directional angle range φ1 that is small with respect to the top surface of the light source LS, and in this case, the fraction of the light may be incident on the second surface 113S2 through the first surface 113S1 of the first protrusion 113 at an angle higher than the critical angle, thereby forming first total internal reflection light. The first total internal reflection light caused by the first protrusion 113 may be incident into the second protrusion 123 and to be emitted toward the outside in the LR as TIRL1.

Thus, even if light emitted from the light source LS has a small angle value in the first directional angle range φ1, the light may not be illuminated as the backward light and may be used to irradiate the LR and increase a utilization factor at the LR. Here, the first directional angle range φ1 may be about light passing through the first protrusion 113, and if light has a directional angle greater than the first directional angle range φ1, the light may have a light propagation path that is different from the afore-described light propagation path. A fraction of the first total internal reflection light may be incident into the second protrusion 123, thereby forming second total internal reflection light.

When light has a second directional angle range φ2 that is greater than the first directional angle range φ1, but less than a third directional angle range φ3, the light may be incident into the first protrusion 113 but may not being subject to total internal reflection. In this case, the second directional angle range φ2 of the light may be preserved, and the light may be emitted as backward light BL. However, when a gap between the second surface 113S2 of the first protrusion 113 and the concave region 111 is formed at an elevated level, e.g., the point P2' is higher along the third direction than as shown in FIG. 4B, the second surface 113S2 may cause total internal reflection of the light having the second directional angle range φ2.

Although not shown in FIG. 4B, depending on a position of the second protrusion 123 in the emission part 120, a fraction of light that has not been subject to total internal reflection by the first protrusion 113 may be directly incident into the second protrusion 123, thereby forming total internal reflection light. In this case, the total internal reflection light caused by the second protrusion 123 may be irradiated onto the LR or a region adjacent thereto.

If light has a third directional angle range φ3 that is greater than the second directional angle range φ2, but less than a fourth directional angle range φ4, the light may not be incident into the first protrusion 113 and may be directly incident into the inner surface of the concave region 111. The light that is directly incident onto the inner surface of the concave region 111 may be totally reflected by a first surface of the second protrusion 123, thereby forming first total internal reflection light. The first total internal reflection light from the first surface of the second protrusion 123 may be totally reflected by a second surface of the second protrusion 123, thereby forming second total internal reflection light. In this case, the second total internal reflection light caused by the second protrusion 123 may propagate toward the plate 150 as TIRL2 and may not be emitted as the backward light.

If light has a fourth directional angle range φ4 that is greater than the third directional angle range φ3, the light may be emitted toward the LR, but not through the first protrusion 113 and the second protrusion 123.

As described above, the lighting lens 10 according to embodiments may have a double total internal reflection structure including the first protrusion 113 and the second protrusion 123, which may make it possible to suppress backward light propagating toward the lighting-dispensable region and to increase a utilization factor at the lighting-necessary region.

Figure 5A:
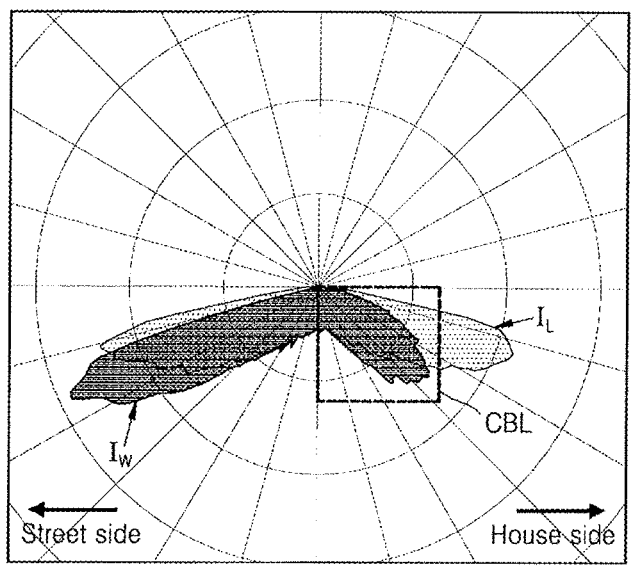
FIGS. 5A and 5B illustrate graphs showing luminous intensity distribution characteristics of a conventional lighting lens and a lighting lens according to some embodiments, respectively.
Figure 5A:
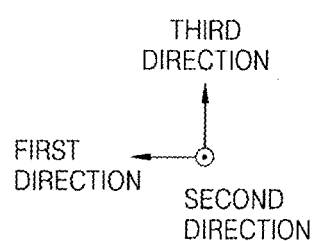
Figure 5B:
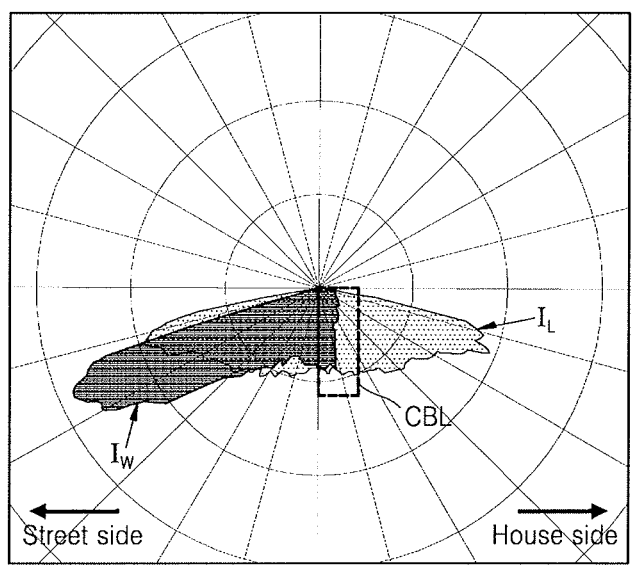
Figure 5B:
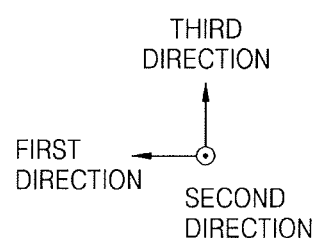

FIGS. 5A and 5B are graphs showing luminous intensity distribution characteristics of a conventional lighting lens and a lighting lens according to some embodiments, respectively. In the graphs of FIGS. 5A and 5B, '$I_L$' represents a luminous intensity distribution in a first direction, along which a LR and NLR are located, and '$I_W$' represents a luminous intensity distribution in a second direction that is perpendicular to the first direction.

For example, when a lighting apparatus is located at an edge of a road, the LR may be a street side and the NLR region may be a house side. In this case, an asymmetric luminous intensity distribution in the first direction, along which the street side and the house side are located, may be desirable. Furthermore, a symmetric luminous intensity distribution at front and rear sides of a street light in the second direction that is parallel to an extension direction of the road may be desirable.

FIG. 5A shows the luminous intensity distributions $I_W$ and $I_L$, in the first and second directions, of a lighting apparatus in which a light source with a conventional lighting lens is provided. The conventional lighting lens may have, for example, a structure that is substantially the same as that of the conventional lighting lens C10 of FIG. 4A. The conventional lighting lens C10 may include an intagliated dome-shaped incidence part C110 to contain the light source LS and a dome-shaped emission part C120 to enclose the incidence part C110. Here, the conventional lighting lens C10 may further include an additional component for suppressing backward light CBL (e.g., a reflection plate). In certain embodiments, a light absorption coating layer may be formed to cover a region of the emission part C120, through which the backward light CBL passes.

A lighting apparatus, in which the light source with the conventional lighting lens is provided, may have a symmetric luminous intensity distribution $I_L$ in the extension direction of the road or in the second direction. The lighting apparatus may have a slightly asymmetric luminous intensity distribution $I_W$ in a width direction of the road or in the first direction. That is, a luminous intensity on the LR (e.g., the street side) may be higher than that on the NLR (e.g., the house side). The asymmetric luminous intensity distribution $I_W$ in the first direction may be a result that is caused by the reflection plate provided to suppress the backward light CBL, or by the light absorption coating layer provided to cover the region of the emission part C120 located on a propagation path of the backward light. However, even using one of these suppression components, a severe light pollution issue may occur at the house side, because about 35% of the total amount of light emitted from the light source is emitted as the backward light CBL.

FIG. 5B shows luminous intensity distributions $I_W$ and $I_L$, in the first and second directions, for a lighting apparatus in which a light source with the lighting lens 10 according to embodiments is provided. The lighting lens 10 may include the first protrusion 113 and the second protrusion 123 which are respectively formed in the incidence part 110 and the emission part 120. One or both of the first and second protrusions 113 and 123 may be configured to cause single or double total internal reflection of light emitted from the light source.

Similar to that of the conventional lighting apparatus, the lighting apparatus, in which the light source with the lighting lens according to embodiments is provided, may have a symmetric luminous intensity distribution $I_L$ in the extension direction of the road or in the second direction.

In the width direction of the road or the first direction, the luminous intensity distribution $I_W$ may be highly asymmetric. For example, about 81% of the total amount of light emitted from the light source may be used as illumination light irradiating the lighting-necessary region or the street side. In contrast, only about 19% of the total amount of light emitted from the light source may be illuminated as backward light BL irradiating the lighting-dispensable region or the house side. The highly asymmetric luminous intensity distribution $I_W$ in the first direction may be a result due to the first and second protrusions 113 and 123.

The use of the lighting lens according to embodiments may make it possible to effectively suppress backward light and to greatly increase a utilization factor at the lightening region, when compared with the backward light suppressing component (e.g., the reflection plate or the light absorption coating layer provided on the emission part).

Also, for the lighting lens according to embodiments, an additional component (e.g., the reflection plate) and/or subsequent processing (e.g., providing light absorption coating layer) after forming the lens may be omitted. Thus, it may be possible to simplify a structure of the lighting lens and to suppress an increase in product cost.

Figure 6A:
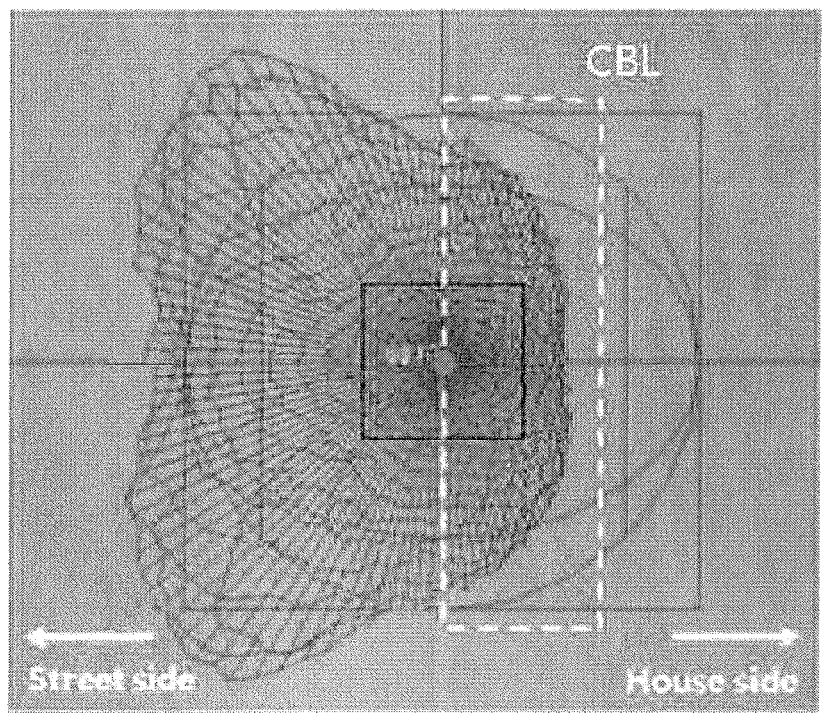
FIGS. 6A and 6B illustrate diagrams showing luminous intensity distribution characteristics of a conventional lighting lens and a lighting lens according to some embodiments, respectively.
Figure 6A:
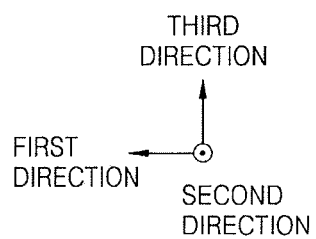
Figure 6B:
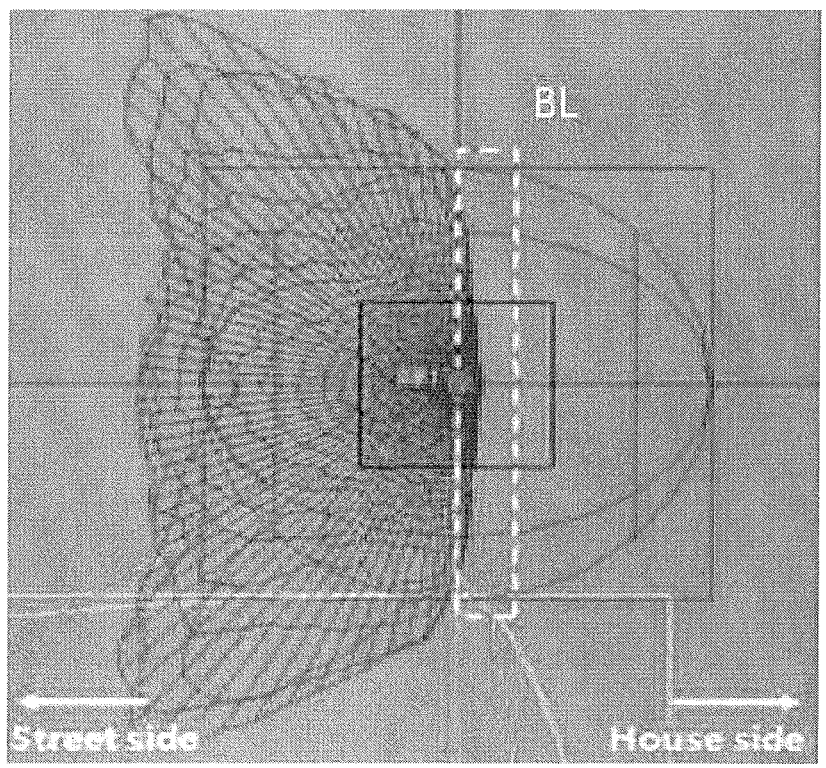
Figure 6B:
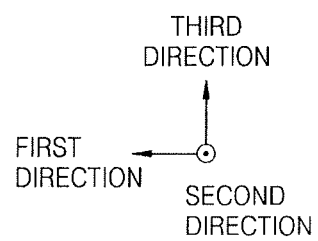
Figure 7A:
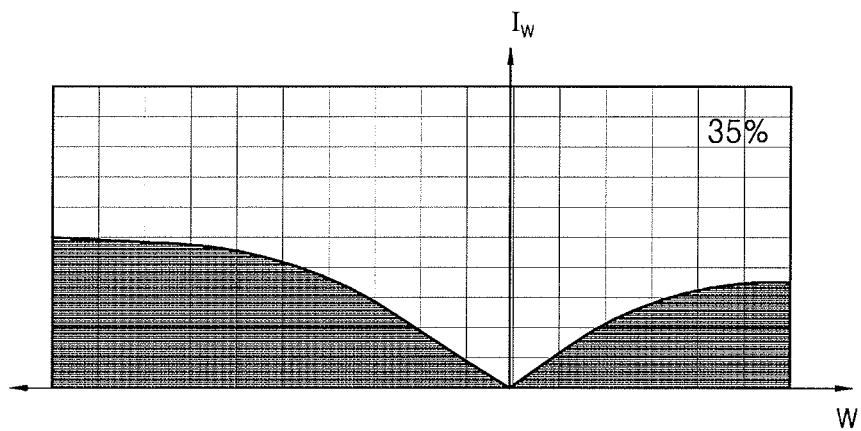
FIGS. 7A and 7B illustrate detailed graphs showing luminous intensity distribution characteristics of a conventional lighting lens and a lighting lens according to some embodiments, respectively.
Figure 7B:
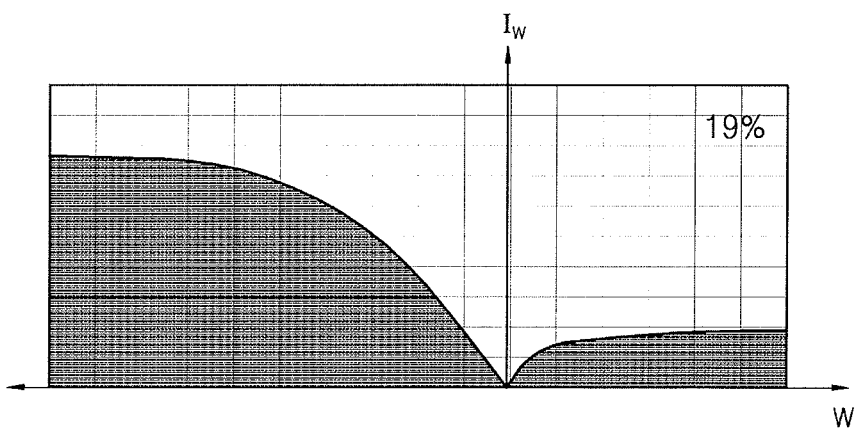

FIGS. 6A and 6B are diagrams showing luminous intensity distribution characteristics of a conventional lighting lens and a lighting lens according to some embodiments, respectively. FIGS. 6A and 6B illustrate luminous intensity distributions, as seen on a top side, of a lighting apparatus with a lighting lens having the luminous intensity distributions $I_L$ and $I_W$ of FIGS. 5A and 5B. FIGS. 7A and 7B are graphs of luminous intensity distribution along the width direction of the backward light of a conventional lighting lens and a lighting lens according to some embodiments, respectively.

A lighting apparatus, in which a light source with a lighting lens is provided, may be positioned at an origin. The left side of the origin may be a street side and the right side of the origin may be a house side.

Referring to FIG. 6A, in an extension direction of a road or a second direction, a luminous intensity distribution was symmetric about the origin. In a width direction of the road or a first direction, the luminous intensity distribution was slightly asymmetric. That is, a luminous intensity on the LR (e.g., the street side) was higher than that on the NLR (e.g., the house side). As previously described with reference to FIG. 5A, and as further illustrated in FIG. 7A, about 35% of the total amount of light emitted from the light source may be illuminated as the backward light CBL propagating toward the house side. Since the backward light CBL has an irradiation region spanning a relatively wide area of the house side, the backward light CBL may result in severe light pollution on the house side.

Referring to FIG. 6B, in an extension direction of a road or a second direction, a luminous intensity distribution was symmetric about the origin, similar to that of the conventional lighting apparatus. In a width direction of the road or a first direction, the luminous intensity distribution was highly asymmetric. As described with reference to FIG. 5B, and as further illustrated in FIG. 7B, only about 19% of the total amount of light emitted from the light source may be illuminated as the backward light BL irradiating the NLR or the house side.

The backward light BL had an irradiation region confined within a very small area of the house side. In other words, a tiny amount of the backward light BL was used to locally irradiate a small region near the origin, at which the lighting apparatus was provided, and this made it possible to substantially suppress the light pollution at the house side. As can be seen form comparing FIGS. 7A and 7B, along the first direction, the luminous intensity distribution was much more asymmetric for the lighting lens according to some embodiments.

Figure 8:
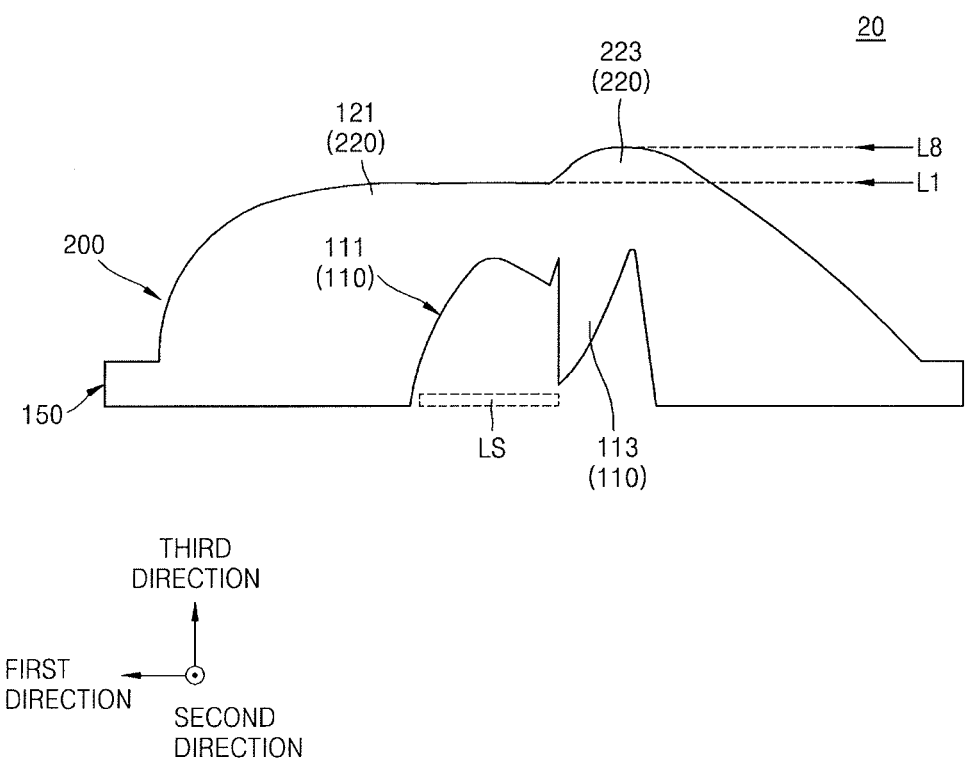
FIG. 8 illustrates a sectional view of a lighting lens according to some embodiments.

FIG. 8 is a sectional view illustrating a lighting lens 20 according to some embodiments. The lighting lens 20 may be configured to have a similar structure to that of the lighting lens 10 of FIGS. 1 to 3, except for a difference in shape of a second protrusion 223. For concise description, a previously described element may be identified by a similar or identical reference number without repeating an overlapping description thereof. Referring to FIG. 8, the lighting lens 20 may include a flat plate 150 and a core 200 on the plate 150. The plate 150 and the core 200 may form a single body.

The core 200 may include the incidence part 110 onto which the light emitted from the light source LS is incident and an emission part 220 from which the light incident onto the incidence part 110 is emitted. The incidence part 110 may include the concave region 111 that contains the light source LS and the first protrusion 113 at a rear side of the light source LS that has a shape protruding downwards from a top surface of the concave region 111.

The emission part 220 may include the dome-shaped part 121 to enclose the incidence part 110 and a second protrusion 223 at the rear side of the light source LS and that protrudes upwards from a top surface of the dome-shaped part 121. The second protrusion 223 may be provided as a single pattern. A top surface of the second protrusion 223 may be positioned at a level L8 that is higher than the level L1 of the top surface of the dome-shaped part 121.

The first and second protrusions 113 and 223 may be used to cause total internal reflection of backward light emitted from the light source LS and propagates towards the NLR. This may allow a propagation path of the backward light to be controlled. For example, the first and second protrusions 113 and 223 may be configured to allow the backward light to be irradiated onto the LR. That is, the first and second protrusions 113 and 223 may control a propagation path of light generated in the light source LS to prevent or suppress backward light from being irradiated onto other regions, except for the LR.

Figure 9:
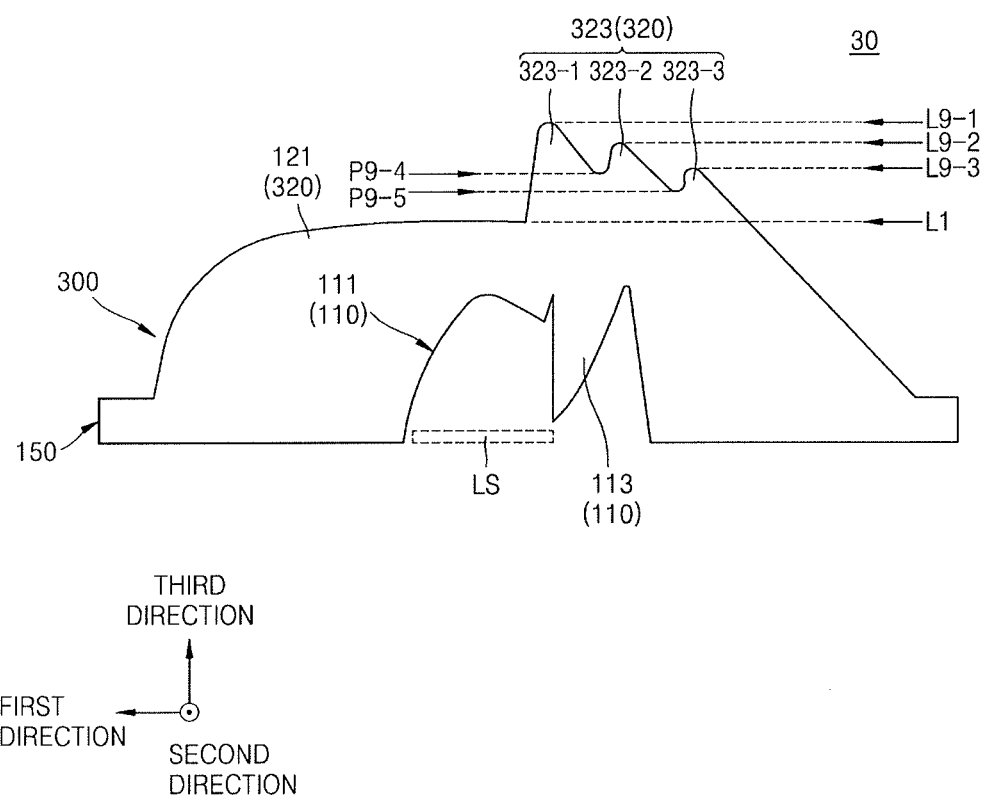
FIG. 9 illustrates a sectional view of a lighting lens according to some embodiments.

FIG. 9 is a sectional view illustrating a lighting lens 30 according to some embodiments. The lighting lens 30 may be configured to have a similar structure to that of the lighting lens 10 of FIGS. 1 to 3, except for a difference in shape of a second protrusion 323. Referring to FIG. 9, the lighting lens 30 may include a flat plate 150 and a core 300 of the plate 150. The plate 150 and the core 300 may be form a single body.

The core 300 may include the incidence part 110 onto which the light emitted from the light source LS is incident and an emission part 320 from which the light incident onto the incidence part 110 is emitted. The incidence part 110 may include the concave region 111 that contains the light source LS and the first protrusion 113 at a rear side of the light source LS and has a shape protruding downwards from a top surface of the concave region 111.

The emission part 320 may include the dome-shaped part 121 to enclose the incidence part 110 and a plurality of second protrusions 323 at the rear side of the light source LS that protrude upwards from a top surface of the dome-shaped part 121. The plurality of second protrusions 323 may be sequentially arranged in a first direction parallel to the concave region 111 and the first protrusion 113. The plurality of second protrusions 323 may include a first protruding component 323-1, a second protruding component 323-2, and a third protruding component 323-3 which are sequentially arranged in the first direction. Each of the first protruding component 323-1, the second protruding component 323-2, and the third protruding component 323-3 may have an outer surface with a gentle slope. Also, each of the recessed regions between the first and second protruding components 323-1 and 323-2 and between the second and third protruding components 323-2 and 323-3, may have a gentle slope. However, owing to the tolerance allowed for a fabrication process, there may be many variations in shape of the emission part 320. For example, each of the first, second, and third protruding components 323-1, 323-2, and 323-3 may be a structure with a sharp peak point.

A top surface of each of the plurality of second protrusions 323 may be positioned at a level L9-1, L9-2, or L9-3 that is higher than the level L1 of the top surface of the dome-shaped part 121. In this case, the level L9-1, L9-2, or L9-3 of the top surface of each of the plurality of second protrusions 323 may decrease in a direction away from the concave region 111. For example, the level L9-1 of the top surface of the first protruding component 323-1 may be higher than the level L9-2 of the top surface of the second protruding component 323-2, and the level L9-2 of the top surface of the second protruding component 323-2 may be higher than the level L9-3 of the top surface of the third protruding component 323-3.

A level L9-4 of a recessed region between the first and second protruding components 323-1 and 323-2. A level L9-5 of a recessed region between the second and third protruding components 323-2 and 323-3 may be higher than the level L1 of the top surface of the dome-shaped part 121, but may be lower than the level L9-4.

As described above, the first protrusion 113 and the plurality of second protrusions 323 may be used to cause total internal reflection of backward light emitted from the light source LS that propagates towards the NLR. This may make it possible to control directivity of the backward light. For example, the first protrusion 113 and the plurality of second protrusions 323 may be configured to allow the backward light to be irradiated onto the LR.

Figure 10:
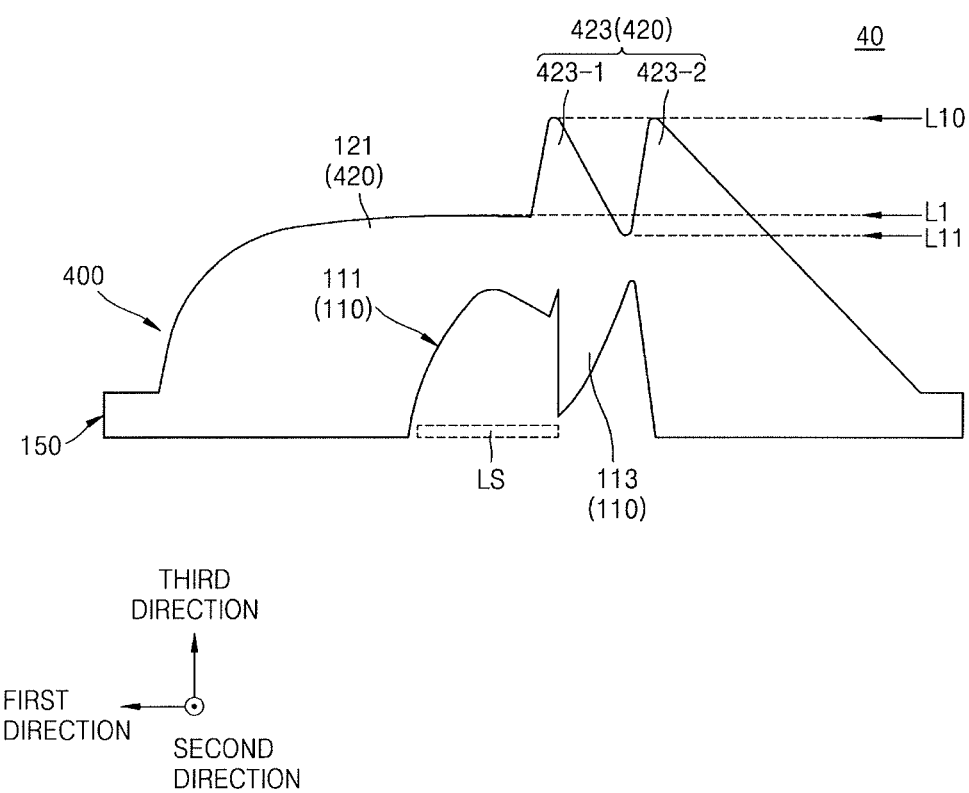
FIG. 10 illustrates a sectional view of a lighting lens according to some embodiments.

FIG. 10 is a sectional view illustrating a lighting lens 40 according to some embodiments. The lighting lens 40 may be configured to have a similar structure to that of the lighting lens 10 of FIGS. 1 to 3, except for a difference in shape of a second protrusion 423. Referring to FIG. 10, the lighting lens 40 may include a flat plate 150 and a core 400 on the plate 150. The plate 150 and the core 400 may be a single body.

The core 400 may include the incidence part 110 onto which the light emitted from the light source LS is incident and an emission part 420 from which the light incident onto the incidence part 110 is emitted. The incidence part 110 may include the concave region 111 to contain the light source LS and the first protrusion 113 provided at a rear side of the light source LS that has a shape protruding downwards from a top surface of the concave region 111.

The emission part 420 may include a dome-shaped part 121 to enclose the incidence part 110, and a plurality of second protrusions 423 provided at the rear side of the light source LS that protrude upwards from a top surface of the dome-shaped part 121.

The plurality of second protrusions 423 may be sequentially arranged in a first direction parallel to the concave region 111 and the first protrusion 113. The plurality of second protrusions 423 may include a first protruding component 423-1 and a second protruding component 423-2 which are sequentially arranged in the first direction.

Each of the first protruding component 423-1 and the second protruding component 423-2 may have a top surface that is positioned at a level L10 that is higher than the level L1 of the top surface of the dome-shaped part 121. Here, the top surfaces of the first and second protruding components 423-1 and 423-2 may be positioned at the same level L10.

A recessed region between the first and second protruding components 423-1 and 423-2 may be positioned at a level L11 that is lower than the level L1 of the top surface of the dome-shaped part 121. This may make it possible to increase an area of a surface S3 of the first protruding component 423-1 participating in the total internal reflection and to allow the light emitted from the light source LS to participate in the total internal reflection with an increased directional angle range. In some embodiments, the level L11 of the recessed region between the first and second protruding components 423-1 and 423-2 may be substantially the same as the level L1 of the top surface of the dome-shaped part 121.

As described above, the first protrusion 113 and the plurality of second protrusions 423 may be used to cause total internal reflection of backward light, which is emitted from the light source LS and propagates toward the NLR. This may make it possible to control directivity of the backward light. For example, the first protrusion 113 and the plurality of second protrusions 423 may be configured to allow the backward light to be irradiated onto the LR.

Figure 11:
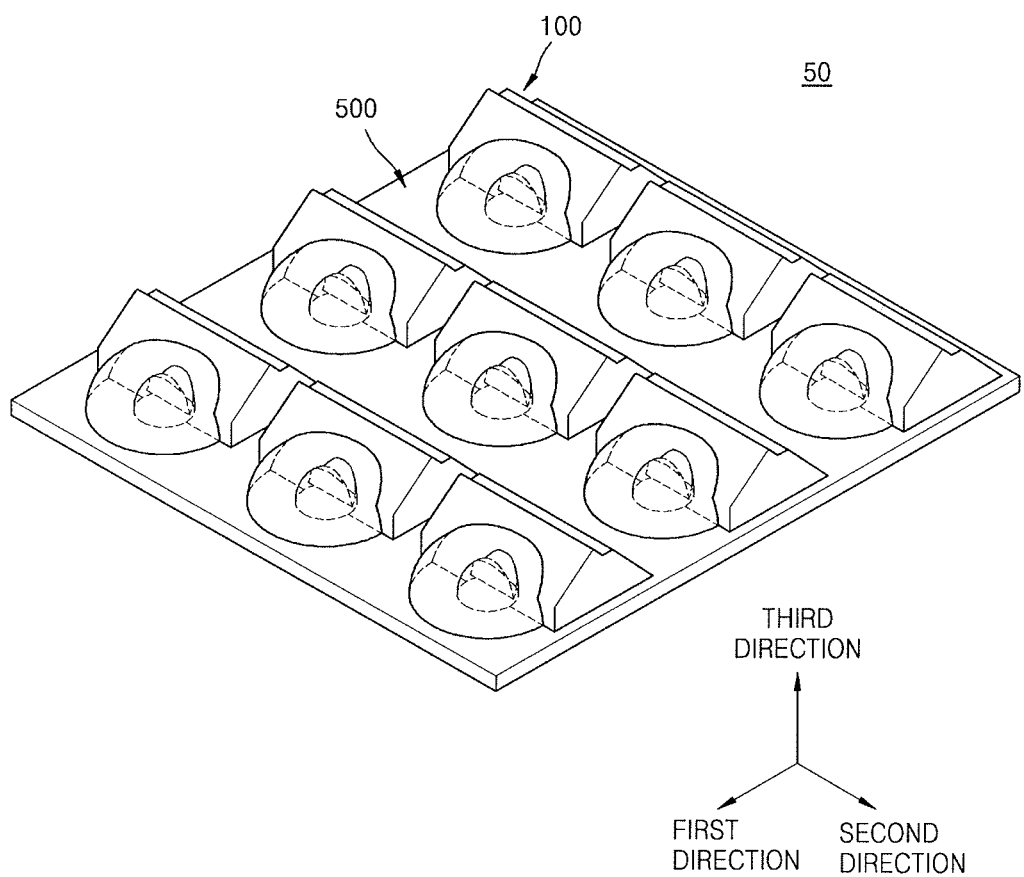
FIG. 11 illustrates a perspective view of a lighting lens array according to some embodiments.

FIG. 11 is a perspective view illustrating a lighting lens array 50 according to some embodiments. The lighting lens array 50 may be configured to have a similar structure to that of the lighting lens 10 of FIGS. 1 to 3, except that a plate 500 is shared by a plurality of cores 100.

Referring to FIGS. 1, 2A, and 11, the lighting lens array 50 may include a flat plate 500 and a plurality of cores 100 arranged on the plate 500. The plate 500 and the plurality of cores 100 may be form a single body. In other words, the plate 500 and the plurality of cores 100 may be formed in a single body by a molding process using a mold and an injection process.

The plate 500 may include a plurality of holes to contain a plurality of light sources, respectively. The plurality of cores 100 may include a plurality of concave regions 111 which are formed to contain the plurality of light sources. The plurality of holes of the plate 500 may be aligned and communicated to the plurality of concave regions 111, respectively.

Each of the plurality of cores 500 may correspond to the core 100 of the lighting lens 10 described with reference to FIGS. 1 to 3. For example, each of the plurality of cores 500 may include the incidence part 110, including the concave region 111 and the first protrusion 113, and an emission part 120, including a dome-shaped part 121 and a second protrusion 123.

The plurality of cores 100 may be arranged in a matrix form on the plate 500 and may be provided to be spaced apart from each other on the plate 550. Each of the plurality of cores 100 may correspond to the core 100 of the lighting lens 10 described with reference to FIGS. 1 to 3. Accordingly, each of the plurality of cores 100 may include the first protrusion 113 in the incidence part 110 and the second protrusion 123 in the emission part 120. The first and second protrusions 113 and 123 may prevent or suppress light emitted from the light source from being illuminated as the backward light. Furthermore, the first and second protrusions 113 and 123 may be used to change a propagation path of light, which may make it possible to increase a utilization factor at the LR.

As shown in FIG. 11, the core 100 of FIGS. 1 to 3 may be used as the core 100 of the lighting lens array 50. However, embodiments are not limited thereto. For example, in certain embodiments, the core 100 of the lighting lens array 50 may be one of the cores 200, 300, and 400 that are included in the lighting lens 20, 30, and 40 of FIGS. 7 to 9.

The lighting lens array 50 may be provided on a light source array including a plurality of light sources to constitute a lighting apparatus. This will be described in more detail with reference to FIG. 14.

Figure 12:
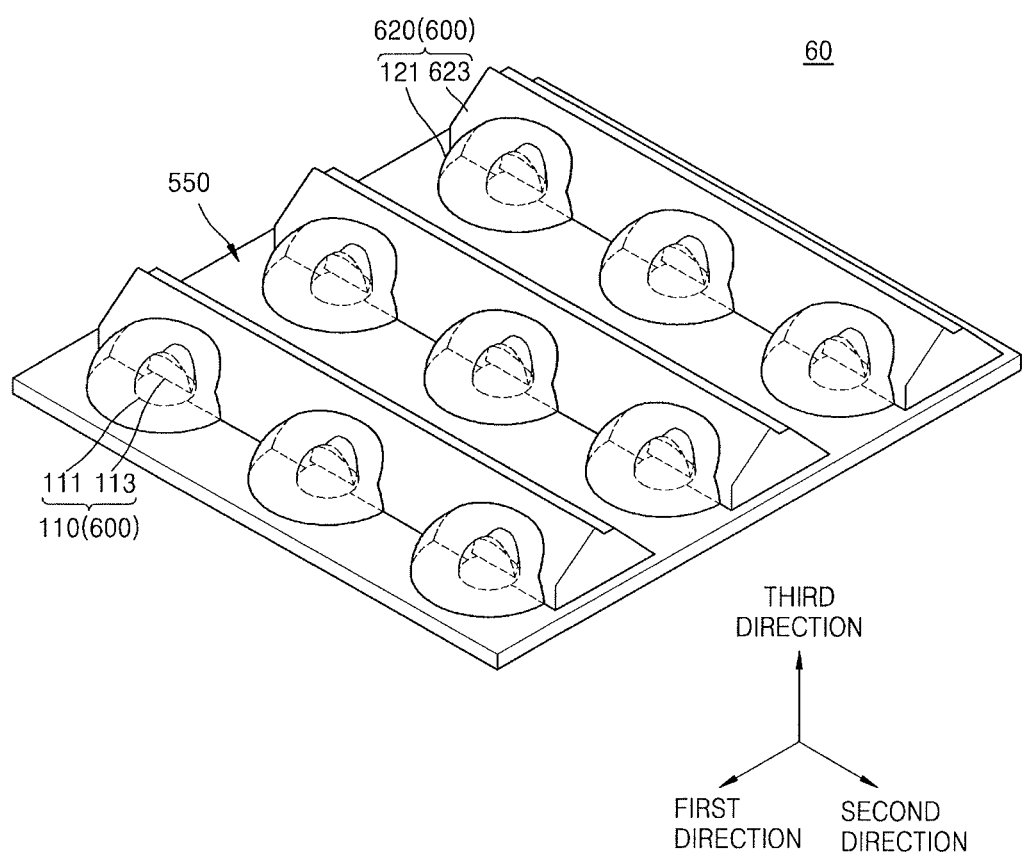
FIG. 12 illustrates a perspective view of a lighting lens array according to some embodiments.

FIG. 12 is a perspective view illustrating a lighting lens array 60 according to some embodiments. The lighting lens array 60 is similar to the lighting lens array 50 of FIG. 11 but the second protrusion 623 of the plurality of cores 600 has a different shape.

Referring to FIG. 11, the lighting lens array 60 may include a flat plate 550 and a plurality of cores 600 arranged on the plate 550. The plate 550 and the plurality of cores 600 may be a single body. In other words, the plate 550 and the plurality of cores 600 may be formed in a single body by a molding process using a mold and an injection process.

Each of the plurality of cores 600 may correspond to the core 100 of the lighting lens 10 described with reference to FIGS. 1 to 3, but each second protrusion 623 may be formed to cover top surfaces of adjacent ones of the plurality of dome-shaped parts 121. For example, some of the cores 600 arranged in a second direction may share one of the second protrusions 623 extending in the second direction. In other words, the second protrusion may extend continuously along the second direction for each dome-shaped parts 121 arranged in the second direction.

When viewed in a section view taken parallel to the first direction, the second protrusion 623 may have the same shape as that of the second protrusion 123 of FIGS. 1 to 3. However, embodiments are not limited thereto. For example, in a section view taken parallel to the first direction, the second protrusion 623 may have the same shape as one of the second protrusions 223, 323, and 423 described with reference to FIGS. 7 to 9.

The first and second protrusions 113 and 623 may prevent or suppress light emitted from the light source from being illuminated as backward light. Furthermore, the first and second protrusions 113 and 623 may be used to change a propagation path of light, which may make it possible to increase a utilization factor at the lightening region.

Figure 13:
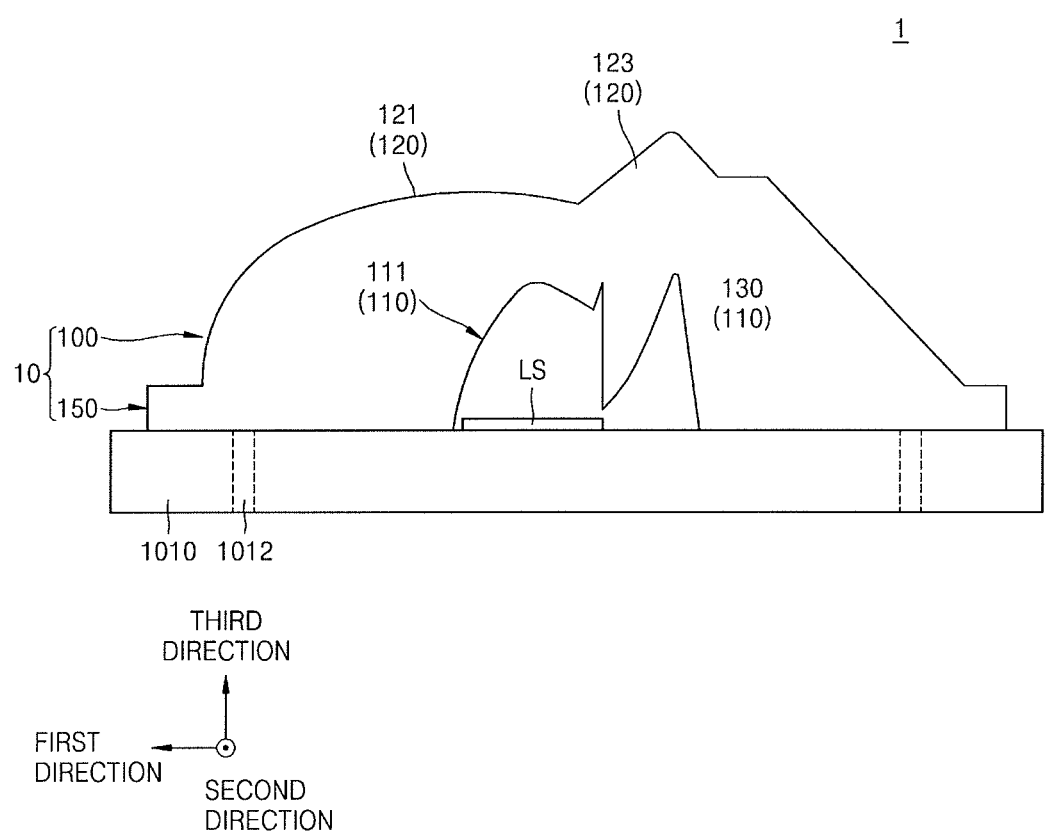
FIG. 13 illustrates a sectional view of a lighting apparatus, in which a lighting lens according to some embodiments is provided.

FIG. 13 is a sectional view illustrating a lighting apparatus 1, in which the lighting lens 10 of FIGS. 1 to 3 according to some embodiments is provided. Referring to FIGS. 1 and 13, the lighting apparatus 1 may include a substrate 1010, the light source LS provided on the substrate 1010, and the lighting lens 10 provided to cover the light source LS.

The substrate 1010 may be a printed circuit board (PCB). However, embodiments are not limited thereto. The substrate 1010 may include a lens coupling hole 1012, which may be used to fasten the lighting lens 10. The lighting lens 10 may include a coupling portion protruding from a bottom surface of the plate 150. The coupling portion may include a plurality of protrusions. The coupling portion may be formed on a bottom surface of the lighting lens 10 and may be coupled to the lens coupling hole 1012 to fasten the lighting lens 10 to the substrate 1010.

The light source LS may be a light-emitting diode (LED) package. However, the light source LS is not be limited thereto. For example, the type of the light source LS may be variously changed according to design requirements. A shape and size of the light source LS may be variously changed.

The lighting lens 10 may be provided on the light source LS. The lighting lens 10 may be provided to enclose the light source LS and may be used to control a propagation path of light to be emitted from the light source LS. As described above, the lighting lens 10 may include first and second protrusions 113 and 123, which are configured to induce at least one total internal reflection in the lighting lens 10, and thus, it may be possible to suppress backward light and to increase a utilization factor at the lightening region.

As shown in FIG. 13, the lighting apparatus 1 may include the core 100 described with reference to FIGS. 1 to 3. However, embodiments are not limited thereto. In certain embodiments, the lighting apparatus 1 may be configured to include one of the lighting lenses 20, 30, and 40 that are described with reference to FIGS. 8 to 10, respectively.

Figure 14:
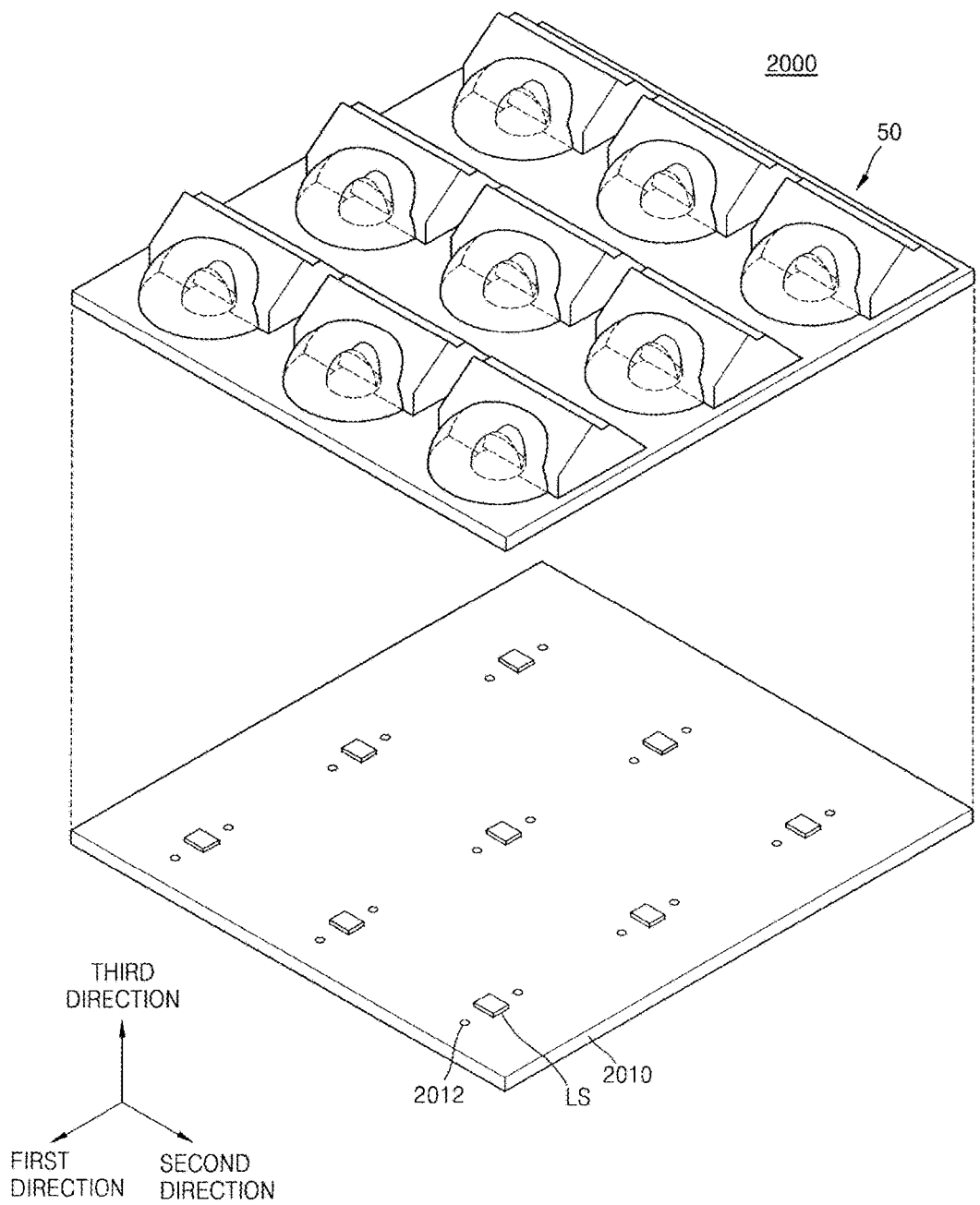
FIG. 14 illustrates a perspective view of a lighting apparatus, in which a lighting lens array according to some embodiments is provided.

FIG. 14 is a sectional view illustrating a lighting apparatus 2000, in which the lighting lens array 50 of FIG. 11 according to some embodiments is provided. Referring to FIGS. 11 and 14, the lighting apparatus 2000 may include a substrate 2010, a plurality of light sources LS arranged on the substrate 2010, and a lighting lens array 50 covering the plurality of light sources LS.

The substrate 2010 may include a lens coupling hole 2012, which is used to fasten the lighting lens array 50. Although not shown in FIGS. 11 and 14, the lighting lens array 50 may include a coupling portion protruding from a bottom surface of the plate 550. The coupling portion may be coupled to the lens coupling hole 2012 to fasten the lighting lens array 50 to the substrate 2010.

As shown in FIG. 14, the lighting apparatus 2000 may include the lighting lens array 50 of FIG. 11. However, embodiments are not limited thereto. In certain embodiments, the lighting apparatus 2000 may include the lighting lens array 60 of FIG. 12. Furthermore, in the lighting lens array 50 or 60, the core 100 or 600 may be replaced with any one of the cores 200, 300, and 400, which are respectively included in the lighting lenses 20, 30, and 40 of FIGS. 8 to 10.

FIG. 15 is a diagram schematically illustrating a light irradiation range of a street light SL, in which a lighting apparatus LM according to some embodiments is provided. Referring to FIG. 15, the street light SL may be provided at an edge of a road. In this case, the LR may be a street side and the NLR may be a house side.

The lighting apparatus LM provided in the street light SL may include a substrate PCB, a light source LS on the substrate PCB, and a lighting lens structure LNS covering the light source LS. The lighting lens structure LNS may be one of the lighting lenses 10, 20, 30, and 40 described with reference to FIGS. 1 to 3 and FIGS. 8 to 10 or one of the lighting lens arrays 50 and 60 described with reference to FIGS. 11 and 12.

The lighting lens structure LNS may include a first protrusion in an incidence part and a second protrusion in an emission part. When a fraction of light emitted from the light source LS propagates in a backward direction, the first and second protrusions may cause the total internal reflection of such backward light at least once, and thus, the backward light may propagate along a changed propagation path (e.g., in a forward direction). In other words, the lighting lens structure LNS may be configured to not only suppress the backward light, but also increase a utilization factor at the LR. Accordingly, the lighting apparatus LM may have an asymmetric luminous intensity distribution between the street side and the house side. For example, most of the light emitted from the lighting apparatus LM may be used to form a LR A1 that is wide in a direction toward the street side, and a tiny fraction of the light emitted from the lighting apparatus LM may be used to form a backward light region A2 that is narrow in a direction toward the house side.

One or more embodiments provide a lighting lens and a lighting lens array that control a luminous intensity distribution and to reduce the amount of diffused light propagating toward a region to be lit, and a lighting apparatus including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lighting lens, comprising:
    an incidence part including a concave region to contain a light source and a first protrusion at a rear side of the light source in a first direction, the first protrusion protruding downwards from a top surface of the concave region along a third direction perpendicular to the first direction; and
    an emission part to emit light provided from the incidence part, the emission part including a dome-shaped part to enclose the incidence part and a second protrusion at the rear side of the light source in the first direction, the second protrusion protruding upwards along the third direction from a top surface of the dome-shaped part, and extends from the dome-shaped part along the first direction and a second direction, perpendicular to the first and third directions such that a length of the second protrusion in the second direction is greater than a length of the dome-shaped part in the second direction, wherein a lowermost portion of the emission part is formed at a first plane, and an angle between an outer surface of the emission part and the first plane is an obtuse angle, and wherein light incident on the second protrusion without being incident on the first protrusion is reflected away from the dome-shaped part and opposite the first direction by the second protrusion.

2. The lighting lens as claimed in claim 1, wherein the concave region, the second protrusion, and the first protrusion are sequentially arranged along an imaginary axis parallel to the first direction, are arranged to be asymmetric in a sectional view taken along the first direction, and are arranged to be symmetric about the imaginary axis in a sectional view taken along the second direction.

3. The lighting lens as claimed in claim 1, wherein, in a sectional view taken along the first direction, an outer surface of the emission part at a front side of the concave region has a first curvature and an outer surface of the emission part at a rear side of the concave region has a second curvature that is less than the first curvature.

4. The lighting lens as claimed in claim 3, wherein the second curvature is 0.

5. The lighting lens as claimed in claim 1, wherein, when viewed in the third direction, the second protrusion has a rectangular or tetragonal shape.

6. The lighting lens as claimed in claim 1, wherein a level of a top surface of the second protrusion is higher than a level of the top surface of the dome-shaped part.

7. The lighting lens as claimed in claim 1, wherein the second protrusion includes a plurality of second protrusions that are sequentially arranged along an imaginary axis parallel to the first direction.

8. The lighting lens as claimed in claim 7, wherein at least one of the plurality of second protrusions has a top surface including a flat surface.

9. The lighting lens as claimed in claim 7, wherein a level of a top surface of each of the plurality of second protrusions along the third direction decreases in along the first direction away from the concave region.

10. The lighting lens as claimed in claim 7, wherein a level of a recessed region between the plurality of second protrusions is higher than a level of the top surface of the dome-shaped part.

11. The lighting lens as claimed in claim 7, wherein a level of a recessed region between the plurality of second protrusions is equal to or lower than a level of the top surface of the dome-shaped part.

12. The lighting lens as claimed in claim 1, wherein:
the light source has a first width in the first direction, and
a point at a highest level of an inner surface of the concave region is spaced apart from a line, at which the dome-shaped part and the second protrusion meet, by a distance equal to or less than ⅓ times the first width in the first direction.

13. The lighting lens as claimed in claim 1, wherein the outer surface of the emission part at a rear side of the concave region has an angle of about 30 to 60 degrees with respect to a third direction perpendicular to the first plane.

14. The lighting lens as claimed in claim 1, wherein:
the first plane is parallel to the first direction and the second direction,
the light source has a first width in the second direction,
the first protrusion has a second width that is greater than the first width in the second direction.

15. A lighting lens array, comprising:
a plate including a plurality of holes corresponding to a plurality of light sources, respectively; and
a plurality of cores on the plate, the plurality of cores respectively being in communication with the plurality of holes and including a plurality of concave regions respectively containing the plurality of light sources,
wherein each of the plurality of cores includes:
an incidence part including the concave region and a first protrusion, the first protrusion being at a rear side of the light source along a first direction and protruding downwards from a top surface of the concave region along a third direction perpendicular to the first direction; and
an emission part to emit light provided from the incidence part, the emission part including a dome-shaped part that encloses the incidence part and a second protrusion at a rear side of the light source, the second protrusion protruding upwards along the third direction from a top surface of the dome-shaped part, and a first surface of the second protrusion immediately adjacent to the dome-shaped part along the first direction overlaps the first protrusion along the third direction such that the first surface of the second protrusion is to receive light from the first protrusion,
wherein a surface of the first protrusion extending in the third direction is perpendicular to a top surface of the first light source in the first direction, and
wherein an intersection line, at which an outer surface of each core of the plurality of cores and a top surface of the plate meet, forms a closed curve on the top surface of the plate.

16. The lighting lens array as claimed in claim 15, wherein the plurality of cores are spaced apart from each other on the plate.

17. The lighting lens array as claimed in claim 15, wherein the plate and the plurality of cores are provided to form a single body.

18. The lighting lens array as claimed in claim 15, wherein adjacent ones of the plurality of second protrusions included in the plurality of cores are connected to each other.

19. The lighting lens array as claimed in claim 18, wherein the plurality of dome-shaped parts are spaced apart from each other.

20. A lighting apparatus, comprising:
a circuit substrate; and
a plurality of light sources on the circuit substrate, the plurality of light sources included on a lighting lens array,
wherein the lighting lens array includes:
a plate including a plurality of holes corresponding to the plurality of light sources, respectively; and
a plurality of cores on the plate, the plurality of cores respectively being in communication with the plurality of holes and including a plurality of concave regions respectively containing the plurality of light sources,
wherein each of the plurality of cores includes:
an incidence part including the concave region and a first protrusion at a rear side of the light source along a first direction, the first protrusion protruding downwards from a top surface of the concave region along a third direction perpendicular to the first direction; and
an emission part to emit light provided from the incidence part, the emission part including a dome-shaped part that encloses the incidence part and a second protrusion at a rear side of the light source, the second protrusion protruding along the third direction from a top surface of the dome-shaped part, and extends from the dome-shaped part along the first direction and a second direction, perpendicular to the first and third directions, such that a length of the second protrusion in the second direction is greater than a length of the dome-shaped part in the second direction, wherein an intersection line, at which an outer surface of each core of the plurality of cores and a top surface of the plate meet, forms a closed curve on the top surface of the plate, and wherein light incident on the second protrusion without being incident on the first protrusion is reflected away from the dome-shaped part and opposite the first direction by the second protrusion.

\* \* \* \* \*